United States Patent

Ishioka

(10) Patent No.: US 7,088,903 B2
(45) Date of Patent: Aug. 8, 2006

(54) OPTICAL GLASS HAVING A SMALL PHOTOELASTIC CONSTANT

(75) Inventor: Junko Ishioka, Sagamihara (JP)

(73) Assignee: Kabushiki Kaisha Ohara, Kanagawa-Ken (JP)

(*) Notice: Subject to any disclaimer, the term of this patent is extended or adjusted under 35 U.S.C. 154(b) by 147 days.

(21) Appl. No.: 10/935,928

(22) Filed: Sep. 8, 2004

(65) Prior Publication Data

US 2005/0058424 A1    Mar. 17, 2005

(30) Foreign Application Priority Data

Sep. 16, 2003    (JP) .............................. 2003-323274

(51) Int. Cl.
*G02B 6/00*    (2006.01)

(52) U.S. Cl. ........................... 385/147; 501/37; 501/41

(58) Field of Classification Search ................ 385/147; 501/37, 41

See application file for complete search history.

(56) References Cited

U.S. PATENT DOCUMENTS

| 2003/0045421 A1* | 3/2003 | Burger et al. ................. 501/41 |
| 2003/0087743 A1* | 5/2003 | Dejneka et al. ............... 501/42 |
| 2004/0018933 A1* | 1/2004 | Ogino et al. .................. 501/45 |
| 2004/0106018 A1* | 6/2004 | Conzone et al ............. 428/704 |
| 2004/0138043 A1* | 7/2004 | Kasuga et al. ................ 501/45 |
| 2004/0235634 A1* | 11/2004 | Kobayashi et al. ........... 501/41 |
| 2005/0188724 A1* | 9/2005 | Ikenishi et al. ................ 65/31 |

FOREIGN PATENT DOCUMENTS

| JP | 11109152 | * | 4/1999 |
| WO | WO 87/02351 | | 4/1987 |
| WO | WO 04/092087 | | 10/2004 |

\* cited by examiner

*Primary Examiner*—Ellen E. Kim
(74) *Attorney, Agent, or Firm*—Hedman & Costigan, P.C.

(57) ABSTRACT

An optical glass having a small photoelastic constant ($\beta$) suitable for parts for polarizing optical system and light polarization control elements and having a refractive index (nd) within a range from 1.60 to 1.68 and an Abbe number ($\nu$ d) within a range from 40 to less than 65 comprises, as atoms constituting the optical glass,

| P  | 5–10 mol % |
| Al | 1–3 mol % |
| Ba | 8–13 mol %, |
| Gd | 1–5 mol % |
| Nb | 0.1–3 mol % |
| F  | 15–35 mol % and |
| O  | 40–52 mol %. |

12 Claims, 1 Drawing Sheet

OPTICAL GLASS HAVING A SMALL PHOTOELASTIC CONSTANT

TECHNICAL FIELD

This invention relates to an optical glass having a small photoelastic constant ($\beta$) which is suitable for parts for polarizing optical system and light polarization control elements and also having physical properties such as refractive index and Abbe number which are useful for optical purposes.

BACKGROUND OF THE INVENTION

An optical system utilizing polarized light, i.e., polarizing optical system, has recently been used in various fields including a liquid crystal display projector. For example, spatial light modulators which modulates polarized light spatially and polarizing beam splitters which separate S polarized light from P polarized light are used for a liquid crystal display projector. In such polarizing optical system, there is growing demand for more accurate control of polarization characteristics.

Among optical parts for the polarizing optical system, parts such as prisms and substrates of light polarizing elements used for a polarizing beam splitter or a spatial light modulator which requires stable maintenance of polarization characteristics must have optical isotropy, since if a material having optical anisotropy is used for these parts, the phase difference (optical path difference) between the ordinary ray and the extraordinary ray with respect to light which has been transmitted by the optical element, and therefore the polarizing characteristic cannot be retained in such a case.

Even if a prior art optical glass which is sufficiently annealed and removed of strain and has optical isotropy is used as an optical part of the polarizing optical system for which maintenance of polarization characteristics is required, such part will exhibit optical anisotropy called birefringence which is caused by a photoelastic effect when mechanical stress or thermal stress is applied to such part, if such part has a large photoelastic constant and, as a result, desired polarization characteristics cannot be obtained. The mechanical stress is produced by, for example, joining a material which has a different thermal expansion coefficient from that of the optical glass with an optical glass. The thermal stress is produced by, for example, heat generated by a peripheral equipment or by heat generated by the optical glass due to absorption of energy of transmitting light. Magnitude of birefringence which the optical glass exhibits upon application of such stress can be expressed by difference in optical path difference. The following formula (1) is established when optical path difference is expressed by $\sigma$(nm), thickness of the optical glass by d(cm) and stress by F(Pa), indicating that birefringence increases with optical path difference.

$$\sigma = \beta \cdot d \cdot F \tag{1}$$

The proportion constant $\beta$ in the above formula (1) is called photoelastic constant the value of which differs by the type of the glass. As shown by the above formula (1), when the same stress (F) applied to two glasses which have the same thickness (d), a glass having a smaller absolute value of photoelastic constant ($\beta$) has a smaller optical path difference ($\sigma$), i.e., smaller birefringence.

Contribution of photoelastic constant to parts for polarizing optical system is described in, for example, Japanese Patent Application Laid-open Publication No. Hei 7-306314, No. Hei 8-234179 and No. Hei 9-127461. As for more specific numerical analysis, Japanese Patent Application Laid-open Publication No. 2000-171770 discloses that parts satisfying the following formula are desirable in the polarizing optical system. The right side of this formula indicates amount of birefringence caused by thermal stress.

$$5.00 \times 10^2 \geq K \cdot \alpha \cdot E \cdot \int (1-T) d\lambda / \rho / Cp \tag{2}$$

where K represents photoelastic constant (nm/mm·mm$^2$/N), $\alpha$ coefficient of linear thermal expansion ($10^{-6}$/K), E Young's modulus($10^3$N/mm$^2$), $\lambda$ wavelength of light used, T internal transmittance of the part at the wavelength $\lambda$, $\rho$ gravity of the part (g/cm$^3$), and Cp specific heat (J/g·k)

In the formula (2), the range of integration is main absorption wavelengths, i.e., 420 (nm) to 500 (nm). It is apparent from the formula (2) that birefringence caused by thermal stress can be reduced as the absolute value of photoelastic constant approaches zero.

Photoelastic constant has wavelength dependency and therefore it is not constant over all visible region (400 nm–700 nm). Therefore, if the wavelength dependency is large, the polarization characteristic is not uniform over all visible region, even if photoelastic constant at wavelength 546 nm which is a representative value in the visible region is small. For example, an optical glass having a high PbO concentration as disclosed in Japaanese Patent Application Laid-open Publication No. Hei 11-133528 has wavelength dependency according to which photoelastic constant decreases toward a shorter wavelength and amount of change $\Delta\beta$ in photoelastic constant in the wavelength range of 400 nm–700 nm becomes about $0.8 \times 10^{-5}$ nm/cm/Pa. When such optical glass is used, for example, as a polarizing beam splitter for a liquid crystal display projector, photoelastic constant $\beta$ is $0.0 \times 10^{-5}$ nm/cm/Pa at green (G) light (wavelength in the vicinity of 550 nm) but the absolute value of $\beta$ becomes about $0.4 \times 10^{-5}$ nm/cm/Pa at blue (B) light (wavelength in the vicinity of 430 nm) and red (R) light (wavelength in the vicinity of 640 nm). Particularaly, since it has a large refractive index in B light, optical path difference due to birefringency becomes large in B light.

Aside from the above described problem of birefringence, an optical glass used for application in which temperature of optical parts changes largely depending upon the environment in which it is used (e.g., heat generation by a prism and lens and peripheral electrical circuits and parts exposed to irradiated light of high intensity) must have a high internal transmittance for preventing elevation of temperature in optical parts due to absorption of irradiated light at high intensity.

Known as optical glasses having a small photoelastic constant which are useful as parts for polarizing optical system are $B_2O_3$—$Al_2O_3$—PbO glasses as disclosed in Japanese Patent Application Laid-open Publication No. Hei 9-48631, phosphate glasses comprising BaO and/or PbO as disclosed in Japanese Patent Applicatin Laid-open Publication No. Hei 11-335135, phosphate glasses comprising no PbO as disclosed in Japanese Patent Application Laid-open Publication No. Hei 11-199269, No. 2000-34132, No. 2002-128540 and No. 2002-338294, and fluoro-phosphate glasses as disclosed in Japanese Patent Application Laid-open Publication No. Hei 9-48633.

As disclosed in literature such as Journal of The Society of Glass Technology (1957) 353T-362T "The Effect of the Polarisation of the Constituent Ions on the Photoelastic Birefringence of the Glass" by Megumi Tashiro, it has been well known that PbO among glass constituents has a large effect of decreasing photoelastic constant. There are various glasses utilizing this effect to cause the glasses to have a small photoelastic constant but, for obtaining a glass having an extremely small photoelastic constant, these glasses must comprise a large amount of a Pb compound such, for example, as PbO and $PbF_2$ which imposes a heavy burden to the environment. This is likely to cause adverse effects to the environment and, therefore, it is not desirable to put such glasses to practical application.

It is disclosed in Journal of the American Ceramic Society Vo.68 (1985) P389-P39 "Photoelastic effects in Phosphate Glasses" by Matsushita et al that in phosphate glasses, particularly $P_2O_5$—BaO glasses have a relatively small photoelastic constant. However, for reducing photoelastic constant to below $0.3×10^{-5}$ nm·cm$^{-1}$·Pa$^{-1}$ by the method of utilizing the photoelastic constant reduction effect by the BaO component only, a special manufacturing process such as super quenching method must be employed because of limitation in the vitrification range of the $P_2O_5$—BaO glasses. This method is of a poor productivity and, moreover, it is difficult to form the glass to a desired optical parts by this method.

Japanese Patent Applicatin Laid-open Publication No. 2002-338294 discloses a method for manufacturing $P_2O_5$—BaO glasses comprising a large amount of BaO and examples having a very small photoelastic constant of $0.15×10^{-12}$(1/Pa) are described in this publication. For obtaining these glasses, however, a method of blowing plural types of gases such as humid air and chlorine gas into melted glass must be employed and this method is of a poor productivity.

Japanese Patent Application Laid-open Publication No. Hei 11-199269 and No. 2000-34132 disclose that, in phosphate glasses which are free of Pb compounds, not only BaO but also $La_2O_3$ is effective for reducing photoelastic constant. It is apparent from examples of these publications that it is difficult to produce glasses having a very small photoelastic constant, particularly glasses having photoelastic constant of $0.3×10^{-5}$ nm·cm$^{-1}$·Pa$^{-1}$ or below in the visible region, by the effect of BaO and $La_2O_3$.

Japanese Patent Application No. 2003-110394 discloses that it is possible to produce phosphate glasses having photoelastic constant of $0.3×10^{-5}$ nm·cm$^{-1}$·Pa$^{-1}$ or below. There is, however, the problem that when phosphate glasses containing a large amount of PbO and BaO is used, platinum or platinum group ions such as palladium and rhodium come out of a platinum crucible during the indispensable manufacturing process of melting of the glass in the platinum crucible with the result that the glass is colored by platinum or platinum group ions. According to Journal of the American Ceramic Society Vo. 39 (1956) P173–P180 "The Colors of Platinum, Palladium, and Rhodium in simple Glasses" by G. E. Rindone et. al., it has become apparent that absorption of platinum ions in phosphate glasses occurs significantly in the vicinity of 400–500 nm. Presence of such absorbing ions causes light absorbed when light of wavelength of 400–500 nm transmits through an optical part to be converted to heat with resulting generation of heat which increases thermal stress in the optical part. When such glass is used for an optical part such as lens or prism in which light transmits through the entire visible region, blue light of 400–500 nm is selectively absorbed with the result that light which has transmitted through the optical part exhibits a yellowish color. Since a glass which has a smaller degree of unnecessary light absorption can realize more excellent properties, though the level of requirement for such condition differs depending upon the purpose of the glass, a glass with a high internal transmittance is desirable. In other words, in manufacturing phosphate glasses containing a large amount of PbO and BaO, much care must be taken for prevention of coming out of platinum group ions.

As disclosed by commercially available fluoro-phosphate glasses (e.g., S-FPL51, S-FPL52 and S-FPL53 manufactured by Ohara Corporation), Japanese Patent Application Laid-open Publication No. Hei-9-48633, U.S. Pat. No. 5,969,861, DE19631171A1 and Japanese Patent Application Laid-open Publication No. Hei 11-60267, bond in fluorophophate glasses is generally not covalent bond as in Si—O but mostly ionic bond and hence change in the electron structure of the glass due to stress is relatively small with the result that these glasses have a relatively small photoelastic constant. Moreover, in fluoro-phosphate glasses, melting of the glass at a relatively low temperature is possible and, therefore, there occurs little or no coming out of platinum group ions from a melting equipment made of platinum such as a crucible and a glass stirring device which takes place in phosphate glasses containing a large amount of PbO and BaO. As a result, there is no problem of selective absorption by the platinum group ions in the visible region (particularly at 400–500 nm).

Besides these fluro-phosphate glasses, known in the art are fluoro-phosphate glasses having a refractive index (nd) in the vicinity of 1.60–1.68 and Abben number (v d) in the vicinity of 40–65, though no mention is made about photoelastic constant, as disclosed in Japanese Patent Application Laid-open No. Sho 50-50416, No. Sho 57-123842, Sho 59-18133 and No. Hei 2-124740 which are characterized by having a large anomalous dispersion characteristic and fluoro-phosphate glasses as disclosed in Japanese Patent Application Laid-open Publication No. Hei 6-157068 and No. Hei 10-53434 which have excellent resistance to devitrification and good melting property.

Fluoro-phosphate glasses generally have a refractive index (nd) of less than 1.6 or Abbe number (v d) of 65 or over, as shown in Japanese Patent Application Laid-open Publication No. Hei 2-124740, No. Hei 6-157068 and Hei 9-48633. For increasing refractive index (nd), in fluoro-phosphate glasses disclosed in Japanese Patent Application Laid-open Publication No. Sho 50-50416, No. Sho 57-123842, No. Sho 59-18133 and No. Hei 11-60267, total amount of fluoride materials is restricted to less than 45% and resulting examples having a refractive index exceeding 1.6 are described. In this case, however, restriction to introduction of fluorides in the glass increases covalent bond in the glass with resulting difficulty in realizing a glass having a desired small photoelastic constant. Further, since the glass of Japanese Patent Application Laid-open Publication No. Hei 10-53434 contains $Al_2O_3$ in high amount of 21.23–26.35 weight % and also contains $MgF_2$ as an essential ingredient, this glass is expected to have a large photoelastic constant.

As fluoro-phosphate glasses for different purposes, fluoro-phosphate glasses for filters containing $CeO_2$ or CuO which is an ingredient which absorbs light of specific wavelength as an essential ingredient are disclosed in Japanese Patent Application Laid-open Publication No. Hei 1-219038, No. Hei 3-83835, No. Hei 3-83834 and No. Hei 4-214043. As for Japanese Patent Application Laid-open Publication No. Hei 1-219038, No. Hei 3-83835 and No. Hei 3-83834, most examples of these glasses contain $P_2O_5$ in a high amount of 20% or more and hence there is high possibility that a desired photoelastic constant cannot be realized by these glasses. In examples of these glasses which contain $P_2O_5$ in an amount of less than 20%, they contain $MgF_2$ which relatively increases photoelastic constant in a high amount (Example No. 1 of Japanese Patent Application Laid-open Publication No. Hei 1-219038) or contain $B_2O_3$ which increases photoelastic constant in a high amount (Example Nos. 2, 4 and 10 of Japanese Patent Application Laid-open Publication No. Hei 3-83835 and Example No. 2 of Japanese Patent Application Laid-open Publication No. Hei 3-83834). Examples of Japanese Patent Application Laid-open Publication No. Hei 4-214043 contain a large amount of $MgF_2$ and hence cannot realize a desired photoelastic constant and, moreover, these glasses are likely to have a low refractive index.

It is, therefore, an object of the present invention to provide an optical glass suitable for parts for polarizing optical system and light polarization control elements which has a small photoelastic constant and also has properties such as refractive index (nd) and Abbe number (ν d) which are useful for purposes of optical glasses.

It is another object of the present invention to provide an optical glass as described above which is free of Pb compounds.

SUMMARY OF THE INVENTION

Studies and experiments made by the inventors of the present invention for achieving the above described objects of the present invention have resulted in the finding, which has led to the present invention, that, by realizing a composition comprising specific amounts of Ba, F and Nb among constituent ingredients of an optical glass, an optical glass having desired properties can be manufactured relatively in a stable manner.

In the first aspect of the present invention for achieving the above described objects of the invention, there is provided an optical glass having a refractive index (nd) within a range from 1.60 to 1.68 and an Abbe number (ν d) within a range from 40 to less than 65 and comprising, as atoms constituting the optical glass,

| | |
|---|---|
| P | 5–10 mol % |
| Al | 1–3 mol % |
| Ba | 8–13 mol %, |
| Gd | 1–5 mol % |
| Nb | 0.1–3 mol % |
| F | 15–35 mol % and |
| O | 40–52 mol %. |

In the second aspect of the invention, there is provided an optical glass having a refractive index (nd) within a range from 1.60 to 1.68 and an Abbe number (ν d) within a range from 40 to less than 65 and comprising, as atoms constituting the optical glass,

| | |
|---|---|
| P | 5–10 mol % |
| Al | 1–3 mol % |
| Ba | 8–13 mol % |
| Gd | 1–5 mol % |
| Nb | 0.1–3 mol % |
| F | 15–35 mol % |
| O | 40–52 mol % and |
| Y | 0–2 mol % and/or |
| La | 0–2 mol % and/or |
| Yb | 0–1 mol % and/or |
| Ta | 0–1 mol % and/or |
| Lu | 0–1 mol % and/or |
| Ti | 0–1.5 mol % and/or |
| Zr | 0–1.5 mol % and/or |
| W | 0–1.5 mol % and/or |
| Bi | 0–1.5 mol % and/or |
| Mg | 0–2 mol % and/or |
| Ca | 0–3 mol % and/or |
| Sr | 0–5 mol % and/or |
| Zn | 0–2 mol % and/or |
| Li | 0–2 mol % and/or |
| Na | 0–2 mol % and/or |
| K | 0–2 mol % and.or |
| Cs | 0–1 mol % and/or |
| Tl | 0–3 mol % and/or |
| Si | 0–2 mol % and/or |
| B | 0–2 mol % and/or |
| Sb | 0–1 mol %. |

In the third aspect of the invention, there is provided an optical glass having a refractive index (nd) within a range from 1.60 to 1.68 and an Abbe number (ν d) within a range from 40 to less than 65 and comprising, in mass %,

| | |
|---|---|
| metaphosphate compounds | 18.0–30.0% |
| where $Al(PO_3)_3$ | 10.0–20.0% |
| $Ba(PO_3)_2$ | 3.0–15.0% |
| fluorides | 43.0–65.0% |
| where $BaF_2$ | 41.0–55.0% |
| $Gd_2O_3$ | 8.0–25.0% and |
| $Nb_2O_5$ | 0.5–7.0%. |

In the fourth aspect of the invention, there is provided an optical glass having a refractive index (nd) within a range from 1.60 to 1.68 and an Abbe number (ν d) within a range from 40 to less than 65 and comprising, in mass %,

| | |
|---|---|
| metaphosphate compounds | 18.0–30.0% |
| where $Al(PO_3)_3$ | 10.0–20.0% |
| $Ba(PO_3)_2$ | 3.0–15.0% and |
| $Sr(PO_3)_2$ | 0.0–10.0% and/or |
| $Ca(PO_3)_2$ | 0.0–10.0% and/or |
| $Zn(PO_3)_2$ | 0.0–5.0% and/or |
| $La(PO_3)_3$ | 0.0–5.0% |
| fluorides | 43.0–65.0% |
| where $BaF_2$ | 41.0–55.0% and |
| $SrF_2$ | 0.0–10.0% and/or |
| $CaF_2$ | 0.0–10.0% and/or |
| $MgF_2$ | 0.0–2.0% and/or |
| $AlF_2$ | 0.0–2.0% and/or |
| $GdF_3$ | 0.0–15.0% and/or |
| $YF_3$ | 0.0–7.0% and/or |
| $LaF_3$ | 0.0–7.0% and/or |
| $KHF_2$ | 0.0–3.0% |
| $Gd_2O_3$ | 8.0–25.0% |
| $Nb_2O_5$ | 0.5–7.0% |
| $Y_2O_3$ | 0.0–10.0% and/or |
| $La_2O_3$ | 0.0–10.0% and/or |
| $Yb_2O_3$ | 0.0–5.0% and/or |
| $Ta_2O_5$ | 0.0–5.0% and/or |
| $Lu_2O_3$ | 0.0–5.0% and/or |
| $TiO_2$ | 0.0–7.0% and/or |
| $ZrO_2$ | 0.0–5.0% and/or |
| $WO_3$ | 0.0–7.0% and/or |
| $Bi_2O_3$ | 0.0–5.0% and/or |
| BaO | 0.0–8.0% and/or |
| CaO | 0.0–5.0% and/or |
| SrO | 0.0–10% and/or |
| ZnO | 0.0–5.0% and/or |
| $Li_2O$ | 0.0–1.0% and/or |
| $Na_2O$ | 0.0–3.0% and.or |
| $K_2O$ | 0.0–3.0% and/or |
| $Cs_2O$ | 0.0–5.0% and/or |
| $Tl_2O$ | 0.0–15.0% and/or |

-continued

| | |
|---|---|
| SiO$_2$ | 0.0–3.0% and/or |
| B$_2$O$_3$ | 0.0–3.0% and/or |
| Sb$_2$O$_3$ | 0.0–3.0%. |

In the fifth aspect of the invention, there is provided an optical glass having a refractive index (nd) within a range from 1.60 to 1.68 and an Abbe number (v d) within a range from 40 to less than 65 and having a composition which comprises, calculated on oxide basis and expressed in mass %,

| | |
|---|---|
| P$_2$O$_5$ | 12–less than 22% |
| Al$_2$O$_3$ | 1–5% |
| BaO | 40–55% |
| Gd$_2$O$_3$ | 8–25% |
| Nb$_2$O$_5$ | 0.5–8% and |
| Y$_2$O$_3$ | 0–10% and/or |
| La$_2$O$_3$ | 0–10% and/or |
| Yb$_2$O$_3$ | 0–5% and/or |
| Ta$_2$O$_5$ | 0–5% and/or |
| Lu$_2$O$_3$ | 0–5% and/or |
| TiO$_2$ | 0–7% and/or |
| ZrO$_2$ | 0–5% and/or |
| WO$_3$ | 0–7% and/or |
| Bi$_2$O$_3$ | 0–5% and/or |
| MgO | 0–1% and/or |
| CaO | 0–5% and/or |
| SrO | 0–10% and/or |
| ZnO | 0–5% and/or |
| Li$_2$O | 0–1% and/or |
| Na$_2$O | 0–3% and/or |
| K$_2$O | 0–3% and/or |
| Cs$_2$O | 0–5% and/or |
| Tl$_2$O | 0–15% and/or |
| SiO$_2$ | 0–3% and/or |
| B$_2$O$_3$ | 0–3% and |
| Sb$_2$O$_3$ | 0–3% | and a fluoride or fluorides of a metal element or elements contained in the above metal oxides, a total amount of F contained in the fluoride or fluorides being 8–20 weight parts to 100 weight parts of said composition calculated on the oxide basis.

In the sixth aspect of the invention, there is provided an optical glass as defined in any of the first to fifth aspect of the invention wherein difference between photoelastic constant at 644 nm and photoelastic constant at 436 nm is within a range from $-0.1 \times 10^{-5}$ nm·cm$^{-1}$·Pa$^{-1}$ to $0.1 \times 10^{-5}$ nm·cm$^{-1}$·Pa$^{-1}$.

In the seventh aspect of the invention, there is provided an optical glass as defined in any of the first to sixth aspect of the invention wherein photoelastic constant at 546 nm is within a range from $-0.1 \times 10^{-5}$ nm·cm$^{-1}$·Pa$^{-1}$ to $0.3 \times 10^{-5}$ nm·cm$^{-1}$·Pa$^{-1}$ in a region of refractive index (nd) within a range from 1.60 to 1.62, photoelastic constant at 546 nm is within a range from $-0.1 \times 10^{-5}$ nm·cm$^{-1}$·Pa$^{-1}$ to $0.5 \times 10^{-5}$ nm·cm$^{-1}$·Pa$^{-1}$ in a region of refractive index (nd) within a range from 1.62 to 1.68.

In the eighth aspect of the invention, there is provided an optical glass as defined in any of the first to seventh aspect having a refractive index (nd) within a range from 1.60 to 1.65 and an Abbe number (v d) within a range from 50 to less than 65 wherein photoelastic constant at 546 nm is within a range from $-0.1 \times 10^{-5}$ nm·cm$^{-1}$·Pa$^{-1}$ to $0.3 \times 10^{-5}$ nm·cm$^{-1}$·Pa$^{-1}$.

In the ninth aspect of the invention, there is provided an optical glass as defined in any of the first to eighth aspect which is free of a Pb compound.

In the tenth aspect of the invention, there is provided a polarizing beam splitter for a liquid crystal display projector using an optical glass as defined in any of the first to ninth aspect.

According to the invention, an optical glass suitable for parts for polarizing optical system and light polarization control elements which has a refractive index (nd) within a range grom 1.60 to 1.68, an Abbe number (v d) within a range from 40 to less than 65 and photoelastic constant at wavelength of 546 nm within a range from $-0.1 \times 10^{-5}$ nm·cm$^{-1}$·Pa$^{-1}$ to $0.5 \times 10^{-5}$ nm·cm$^{-1}$·Pa$^{-1}$ and in which wavelength dependency of the photoelastic constant is extremely small can be obtained without using a Pb compound and, therefore, optical parts having excellent properties which have not been produced in the past can be provided.

BRIEF DESCRIPTION OF THE DRAWING

In the accompanying drawing.

DETAILED DESCRIPTION OF THE INVENTION

Figure 1:
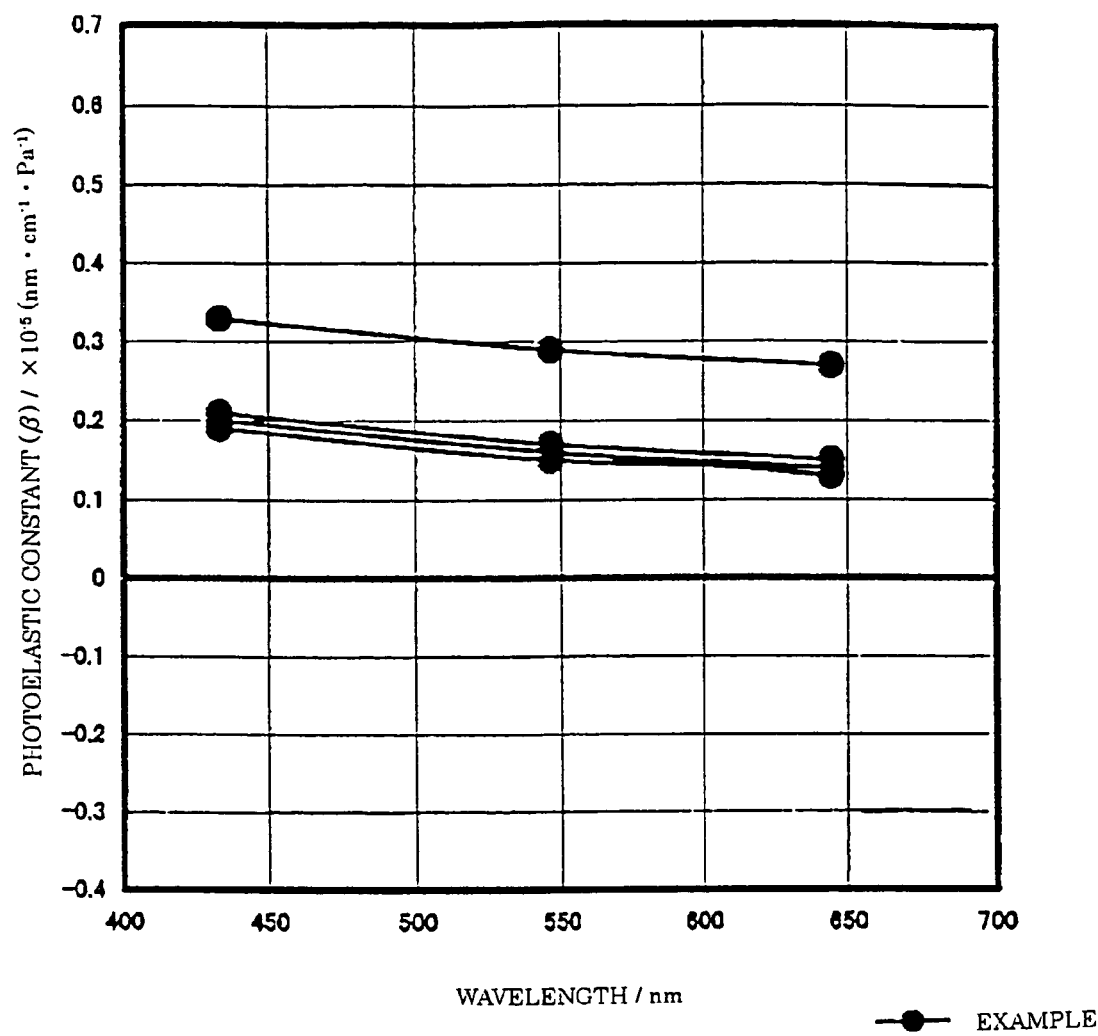
FIG. 1 is a graph plotting photoelastic constants of respective examples of the invention.

Optical glasses of the first and second aspects of the invention can realize a refractive index (nd) within a range from 1.60 to 1.68 which is particularly useful for producing a polarizing film in an optical design which has been difficult to realize with the prior art fluoro-phosphate glasses. Moreover these optical glasses having a small photoelastic constant can realize production of optical elements such as a polarizing beam splitter with reduced birefringency due to thermal and mechanical stresses. Further, the optical constants of refractive index and Abbe number thus realized expand the degree of freedom in the optical design, thereby enabling flexible adaptation of the optical glasses to diversified production needs.

P is a glass forming ingredient. If the amount of this ingredient is less than 5 mol %, it becomes difficult to produce a stable glass. If the amount of this ingredient exceeds 10 mol %, a desired photoelastic constant cannot be achieved. Therefore, the amount of this ingredient should be 5 mol % or over, preferably 5.5 mol % or over and, most preferably, be 6 mol % or over and should be 10 mol % or below, preferably 9.8 mol % or below and, most preferably, be 9.5 mol % or below.

In these glasses, P can be added in the form of LiPO$_3$, NaPO$_3$, KPO$_3$, Al(PO$_3$)$_3$, Ba(PO$_3$)$_2$, Sr(PO$_3$)$_2$, Ca(PO$_3$)$_2$, Mg(PO$_3$)$_2$, Zn(PO$_3$)$_2$, La(PO$_3$)$_2$, P$_2$O$_5$, H$_3$PO$_4$, NH$_4$H$_2$PO$_4$, (NH$_4$)$_2$HPO$_4$, Li$_3$PO$_4$, KPO$_4$, Na$_3$PO$_4$·12H$_2$O, Na$_2$HPO$_4$·12H$_2$O, Mg$_3$(PO$_4$)$_2$·8H$_2$O, CaHPO$_4$·2H$_2$O, Ba$_3$(PO$_4$)$_2$, Zn$_3$(PO$_4$)$_2$·4H$_2$O, AlPO$_4$, BPO$_4$, KH$_2$PO$_4$, K$_2$HPO$_4$, KPF$_6$, Zn$_2$PO$_7$ or BaHPO$_4$. It is preferable to use Al(PO$_3$)$_3$, Ba(PO$_3$)$_2$, Sr(PO$_3$)$_2$, Ca(PO$_3$)$_2$, La(PO$_3$)$_2$, P$_2$O$_5$, H$_3$PO$_4$, NH$_4$H$_2$PO$_4$, or (NH$_4$)$_2$HPO$_4$.

Al is effective for preventing devitrification of the glass and thereby enable production of a stable glass and also improving mechanical strength and chemical durability and, therefore, at least 1 mol % of this ingredient should be added. If this amount of this ingredient exceeds 3 mol %, it becomes difficult to realize a desired photoelastic constant and optical constants. Therefore, the amount of this ingredient should be 1 mol % or over, preferably 1.3 mol % or over and, most preferably, be 1.5 mol % or over and should be 3 mol % or below, preferably 2.9 mol % or below and, most preferably, be 2.8 mol % or below.

In these glasses, Al may be added in the form of $Al(PO_3)_3$, $AlPO_4$, $Al_2O_3$, $Al(OH)_3$, $AlF_3$ or $Na_3AlF_6$. It is preferable to use $Al(PO_3)_3$, $AlPO_4$, $AlF_3$ or $Na_3AlF_6$.

Among glass constituent ingredients, Ba is remarkably effective for reducing photoelastic constant and should be contained in an amount of at least 8 mol %. If, however, the amount of this ingredient exceeds 13 mol %, it becomes difficult to obtain a stable glass. The amount of this ingredient should be 8 mol % or over, preferably 8.3 mol % and, most preferably, be 8.5 mol % or over and should be 13 mol % or below, preferably 12.8 mol % or below and, most preferably, be 12.5 mol % or below. In these glasses, Ba may be added in the form of $Ba(PO_3)_2$, $Ba_3(PO_4)_2$, $BaHPO_4$, $Ba(NO_3)_2$, $BaCO_3$, $BaF_2$ or $BaSiF_6$. It is preferable to use $Ba(PO_3)_2$, $Ba(NO_3)_2$, $BaCO_3$ or $BaF_2$.

Gd is an essential ingredient for facilitating forming of a stable glass and realizing a high refractive index. If the amount of this ingredient is less than 1 mol %, the glass tends to become significantly instable whereas if the amount of this ingredient exceeds 5 mol %, melting of the glass at a high temperature becomes necessary with resulting increase in evaporation of ingredients, particularly fluorine ingredient. Therefore, for realizing a very small photoelastic constant, the amount of this ingredient should be 1 mol % or over, preferably 1.2 mol % or over and, most preferably, be 1.3 mol % or over and should be 5 mol % or below, preferably 4.5 mol % or below and, most preferably, be 4 mol % or below.

In these glasses, Gd may be added in the form of any Gd compound. It is preferable to use $Gd_2O_3$ or $GdF_3$.

Nb is an essential ingredient in these optical glasses of the present invention, since it is effective for realizing a high refractive index and improving chemical durability of the glass by addition of a small amount of this ingredient and may be added in an amount not exceeding 3 mol %. If the amount of this ingredient is less than 0.1 mol %, these effects cannot be obtained and desired optical constants cannot be realized whereas addition of this ingredient in an amount exceeding 3 mol % is not desirable because it increases photoelastic constant. The amount of this ingredient should be 0.1 mol % or over, preferably 0.2 mol % or over and, most preferably, be 0.3 mol % or over and should be 3 mol % or below, preferably 2.8 mol % or below and, most preferably, be 2.5 mol % or below.

Nb may be added in the form of any Nb compound. It is preferable to use $Nb_2O_5$.

F is an indispensable glass-forming ingredient in a fluorophosphate glass and is an essential ingredient in these glasses, since it is highly effective for improving melting property of the glass and reducing photoelastic constant. If the amount of this ingredient is less than 15 mol %, it becomes difficult to obtain a stable glass with a desired photoelastic constant. If the amount of this ingredient exceeds 35 mol %, it becomes difficult to realize a desired photoelastic constant. The amount of this ingredient should be 15 mol % or over, preferably 17 mol % or over and, most preferably, be 19 mol % or over and should be 35 mol % or below, preferably 34 mol % or below and, most preferably, be 33 mol % or below.

F may be added in the form of $BaF_2$, $SrF_2$, $CaF_2$, $MgF_2$, $AlF_3$, $GdF_3$, $YF_3$, $LaF_3$, $KHF_2$, $BaSiF_6$, LiF, NaF, KF, $ZnF_2$, $KPF_6$, $ZrF_4$, $K_2SiF_6$, $Na_3AlF_6$ or $Na_2SiF_6$. It is preferable to use $BaF_2$, $SrF_2$, $CaF_2$, $MgF_2$, $AlF_3$, $GdF_3$, $YF_3$, $LaF_3$ or $KHF_2$.

O is an indispensable glass-forming ingredient in a fluorophosphate glass and is an essential ingredient for realizing a desired optical constants. If the amount of this ingredient is less than 40 mol %, it becomes difficult to obtain a stable glass with a desired photoelastic constant. If the amount of this ingredient exceeds 52 mol %, it becomes difficult to realize desired optical constants. The amount of this ingredient should be 40 mol % or over, preferably 41 mol % or over and, most preferably, be 42 mol % or over and should be 52 mol % or below, preferably 51 mol % or below and, most preferably, be 50 mol % or below.

Y, La, Yb, Ta, Lu, Ti, Zr, W and Bi may be optionally added since these ingredients can adjust refractive index and Abbe number. More specifically, Y and La ingredients are effective for realizing a high refractive index without increasing photoelastic constant and may be added respectively in an amount up to 2 mol %, preferably up to 1.9 mol % and, most preferably, up to 1.8 mol %. Addition of an excessive amount of these ingredients, however, deteriorates resistance to devitrification of the glass. Yb, Ta and Lu are effective for realizing a high refractive index but addition of an excessive amount of these ingredients makes the glass instable. These ingredients, therefore, may be added respectively in an mount up to 1.0 mol %, preferably 0.9 mol % and, most preferably, up to 0.8 mol %. Zr is effective for adjusting refractive index and improving mechanical strength of the glass. Since addition of this ingredient in an amount exceeding 1.5 mol % requires melting at a high temperature, this ingredient may be added in an amount up to 1.5 mol %, preferably up to 1.45 mol % and, most preferably, up to 1.4 mol %. Ti, W and Bi are effective for realizing a high refractive index and adjusting Abbe number but addition of an excessive amount of these ingredients colors the glass and, therefore, these ingredients may be added respectively in an amount up to 1.5 mol %, preferably up to 1.45 mol % and, most preferably, up to 1.4 mol %.

Y, La, Yb, Ta, Lu, Ti, Zr, W and Bi may be added in the form of any desired compound. It is preferable to add these ingredients in the form of an oxide or a fluoride.

Mg, Ca, Sr and Zn are effective for stabilizing the glass (improving resistance to devitrification) by addition of a suitable amount of these ingredients and therefore may be added when necessary. Addition of an excessive amount of these ingredients, however, makes it difficult to realizie desired photoelastic constant and refractive index. Ca may be added in an amount up to 3 mol %, preferably up to 2.95 mol % and, most preferably, up to 2.9 mol %. Sr may be added in an amount up to 5 mol %, preferably up to 4.5 mol % and, most preferably, up to 4 mol %. Zn may be added in an amount up to 2 mol %, preferably up to 1.95 mol % and, most preferably, up to 1.9 mol %. Since Mg significantly increases photoelastic constant, it may be added in an amount up to 2 mol % and preferably up to 1 mol %. Most preferably, this ingredient should not be added at all.

Mg, Ca, Sr and Zn may be added in the form of any desired compound but it is preferable to add these ingredients in the form of an oxide, fluoride, carbonate and/or nitrate.

Li, Na, K and Cs are effective for improving melting property and defoaming property of the glass. Li, Na and K may be optionally added respectively in an mount up to 2.0 mol %, preferably 1.95 mol % and, most preferably, up to 1.9 mol %. Cs may be optionally added in an amount up to 1 mol %, preferably up to 0.95 mol % and, most preferably, up to 0.9 mol %. An excessive addition of these ingredients is not desirable since it will make the glass instable and generate devitrification.

Li, Na, K and Cs may be added in the form of any desired compound but it is preferable to add these ingredients in the form of an oxide, fluoride carbonate and/or nitrate.

Tl is effective for improving melting property and reducing photoelastic constant while adjusting refractive index and Abbe number and may be added as an optional ingredient. If the amount of this ingredient exceeds 3 mol %, the glass is colored significantly and, therefore, this ingredient may be added in an amount up to 3 mol %, preferably up to 2.7 mol % and, most preferably, up to 2.5 mol %. Tl may be added in the form of any desired compound but it is preferable to add this ingredient in the form of an oxide.

Si and B are effective for adjusting refractive index and improving mechanical strength but these ingredients increase photoelastic constant significantly. These ingredients may therefore be optionally added in an amount up to 2 mol % and preferably up to 1 mol %. Most preferably, these ingredients should not be added at all. Si and B may be added in the form of any desired compound but it is preferable to add these ingredients in the form of an oxide and/or any desired complex salt.

For refining and homogenizing the optical glasses of the present invention, Sb which is a known defoaming agent, may be optionally added. In addition to these effects, this ingredient can adjust refractive index and photoelastic constant and this ingredient may be added in amount up to 1 mol %. Addition of an excessive amount of this ingredient is undesirable because it enhances excessive bubbling during melting of the glass. Sb may be added in the form of any desired compound but it is preferable to add this ingredient in the form of an oxide.

Description will now be made about the optical glass of the third aspect of the invention.

$Al(PO_3)_3$ is a particularly preferable ingredient in this glass since it functions as a glass forming ingredient. For producing a stable glass, addition of this ingredient in an amount of 10 mass % or over is necessary. If, however, the amount of this ingredient exceeds 20 mass %, it becomes difficult to realize desired photoelastic constant and optical constants. The amount of this ingredient to the entire mass of the glass, therefore, should be 10 mass % or over, preferably 11 mass % or over and, most preferably, be 12 mass % or over and should be 20 mass % or below, preferably 18 mass % or below and, most preferably, be 17 mass % or below.

$Ba(PO_3)_2$ is a particularly preferable ingredient in this glass, since it functions as a glass-forming ingredient and is also effective for reducing photoelastic constant and increasing refractive index. For realizing desired properties, addition of this ingredient in an amount of at least 3 mass % is necessary. If, however, the amount of this ingredient exceeds 15 mass %, desired photoelastic constant cannot be obtained, since $P_2O_5$ has a function of increasing photoelastic constant. The amount of this ingredient to the entire mass of the glass, therefore, should be 3 mass % or over, preferably 5 mass % or over and, most preferably, be 6 mass % or over and should be 15 mass % or below, preferably 14 mass % or below and, most preferably, be 13 mass % or below.

If the total amount of metaphosphate compounds is less than 18 mass %, it becomes difficult to obtain a stable glass whereas if it exceeds 30 mass %, it becomes difficult to realize desired properties, particularly a small photoelastic constant. The amount of this ingredient to the entire mass of the glass, therefore, should be 18 mass % or over, preferably 19 mass % or over and, most preferably, be 20 mass % or over and should be 30 mass % or below, preferably 29 mass % or below and, most preferably, be 28 mass % or below.

$BaF_2$ is effective for reducing photoelastic constant and improving melting property of the glass and, therefore, it is an important ingredient in this glass. If the amount of this ingredient is less than 41 mass %, a glass with a small photoelastic constant cannot be realized whereas if the amount of this ingredient exceeds 55 mass %, the glass becomes significantly instable and, moreover, a desired refractive index (nd) of 1.60 to 1.68 cannot be realized. The amount of this ingredient to the entire mass of the glass, therefore, should be 41 mass % or over, preferably 41.5 mass % or over and, most preferably, be 41.8 mass % or over and should be 55 mass % or below, preferably 50 mass % or below and, most preferably, be 49 mass % or below.

If the total amount of fluorides is less than 43 mass %, covalent bond in the glass increases with resulting increase in photoelastic constant whereas if it exceeds 65 mass %, desired refractive index cannot be realized and, moreover, disadvantages such as cords tend to take place. For realizing a very small photoelastic constant, the amount of this ingredient to the entire mass of the glass should be 43 mass % or over, preferably 43.5 mass % or over and, most preferably, be 43.8 mass % or over and should be 65 mass % or below, preferably 64 mass % or below and, most preferably, be 63 mass % or below.

$Gd_2O_3$ is an essential ingredient for facilitating forming of a stable glass and realizing a high refractive index. If the amount of this ingredient is less than 8 mass %, the glass becomes significantly instable and, moreover, desired refractive index cannot be realized whereas if the amount of this ingredient exceeds 25 mass %, melting of the glass at a high temperature becomes necessary with resulting increase in evaporation of ingredients, particularly fluorine ingredient increases during melting. The amount of this ingredient to the entire mass of the glass, therefore, should be 8 mass % or over, preferably 9 mass % or over and, most preferably, be 9.5 mass % or over and should be 25 mass % or below, preferably 20 mass % or below and, most preferably, be 19 mass % or below.

$Nb_2O_5$ is an essential ingredient in this glass since it can realize a high refractive index and improve chemical durability by addition of this ingredient in a small amount and may be added in an amount up to 7.0 mass %. If the amount of this ingredient is less than 0.5 mass %, these effects cannot be realized and desired optical constants cannot be realized whereas if the amount of this ingredient exceeds 7.0 mass %, it increases photoelastic constant. The amount of this ingredient to the entire mass of the glass, therefore, should be 0.5 mass % or over, preferably 0.8 mass % or over and, most preferably, be 1.0 mass % or over and should be 7.0 mass % or below, preferably 6.5 mass % or below and, most preferably, be 6.0 mass % or below.

Description will now be made about the optical glass of the fourth aspect of the invention. Reasons for limiting the composition of the glass of the fourth aspect will be described below. As to ingredients which overlap with the above described ingredients, the same reasons for limiting the amount of the ingredients will apply.

$Sr(PO_3)_2$, $Ca(PO_3)_2$, $Zn(PO_3)_2$ and $La(PO_3)_3$ have a function of glass forming ingredients and may be added, if necessary. Since $Sr(PO_3)_2$ is effective for reducing photoelastic constant in addition to the above described function, it may be added in an amount up to 10 mass %, preferably up to 9 mass % and, most preferably, up to 8 mass %. $Ca(PO_3)_2$ is effective for improving stability of the glass and, therefore, may be added in an amount up to 10 mass %, preferably 9 mass % and, most preferably, up to 8 mass %. :$Zn(PO_3)_2$ is effective for increasing photoelastic constant and, therefore, may be added in an amount up to 5 mass %, preferably up to 4 mass % and, most preferably, up to 3 mass %. Addition of $La(PO_3)_3$ in an amount exceeding 5 mass % deteriorates resistance to devitrification of the glass and, therefore, this ingredient may be added in an amount up to 5 mass %, preferably up to 4 mass % and, most preferably, up to 3.5 mass %. The total amount of metaphosphate compounds is the same as the optical glass of the third aspect.

Since $SrF_2$ and $CaF_2$ are effective, like $BaF_2$, for reducing photoelastic constant and may be added respectively in an amount up to 10 mass %, preferably up to 9 mass % and, most preferably, up to 8.5 mass %. If the amount of these ingredients respectively exceed 10 mass %, desired refractive index cannot be realized. $MgF_2$ and $AlF_3$ are effective for improving melting property and mechanical strength of the glass but addition of an excessive amount of these ingredients significantly increases photoelastic constant and, therefore, these ingredients may be added respectively in an amount up to 2 mass % and preferably up to 1 mass %. Most preferably, these ingredients should not be added at all.

$GdF_3$ and $LaF_3$ are effective for increasing refractive index while maintaining photoelastic constant. $GdF_3$ may be added in an amount up to 15 mass %, preferably up to 14 mass % and, most preferably, up to 13.5 mass %. Addition of this ingredient in an amount exceeding 15 mass % significantly makes the glass instable.: $LaF_3$ may be added in an amount up to 7 mass %, preferably up to 6 mass % and, most preferably, up to 5 mass %. Addition of this amount in an excessive amount significantly makes the glass instable.

$YF_3$ is effective for stabilizing the glass and adjusting refractive index and, therefore, may be added in an amount up to 7 mass %, preferably up to 6 mass % and, most preferably, up to 5.5 mass %. Addition of this ingredient in an excessive amount increases photoelastic constant.

$KHF_2$ is effective for improving melting property and defoaming property of the glass and, therefore, may be added in an amount up to 3 mass %, preferably up to 2.5 mass % and, most preferably, up to 2 mass %. Addition of this ingredient in an excessive amount significantly reduces refractive index with the result that a desired refractive index cannot be realized. As to the total amount of fluorides, the foregoing description with respect to the optical glass of the third aspect will apply.

The metal oxides $Y_2O_3$, $La_2O_3$, $Yb_2O_3$, $Ta_2O_5$, $Lu_2O_3$, $TiO_2$, $ZrO_2$, $WO_3$ and $Bi_2O_3$ can adjust refractive index and Abbe number and, therefore, may be added as optional ingredients. More specifically, $Y_2O_3$ and $La_2O_3$ can realize a high refractive index without increasing photoelastic constant and, therefore, may be added respectively in an amount up to 10.0 mass %, preferably up to 8 mass % and, most preferably, up to 7 mass %. Addition of these ingredients in an excessive amount deteriorates resistance to devitrification of the glass. $Yb_2O_3$, $Ta_2O_5$, $Lu_2O_3$ and $Bi_2O_3$ are effective for realizing a high refractive index but addition of these ingredients in an excessive amount makes the glass instable and, therefore, may be added respectively in an amount up to 5 mass %, preferably up to 4 mass % and, most preferably, up to 3 mass %. $ZrO_2$ is effective for adjusting refractive index and mechanical strength of the glass but addition of this ingredient in an amount exceeding 5.0 mass % requires melting at a high temperature and, therefore, may be added in an amount up to 5 mass %, preferably 4.5 mass % and, most preferably, up to 4 mass %. $TiO_2$ and $WO_3$ are effective for realizing a high refractive index and adjusting Abbe number but addition of this ingredient in an excessive amount colors the glass and, therefore, may be added respectively in an amount up to 7 mass %, preferably up to 6 mass % and, most preferably, up to 5 mass %.

BaO is highly effective for reducing photoelastic constant and adjusting refractive index and Abbe number and, therefore, may be optionally added, in addition to $BaF_2$, in an amount up to 8 mass %, preferably up to 7.5 mass % and, most preferably, up to 7 mass %. Addition of this ingredient in an amount exceeding 8 mass % is undesirable because it significantly makes the glass instable.

CaO, SrO and ZnO are effective for stabilizing the glass, i.e., improving resistance to devitrification by addition of these ingredients in a small amount and may be added as optional ingredients. Addition of these ingredients in an excessive amount, however, makes it difficult to realize desired photoelastic constant and refractive index. CaO and ZnO, therefore, may be added in an amount up to 5.0 mass %, preferably 4.5 mass % and, most preferably, up to 4.0 mass %. SrO may be added in an amount up to 10 mass %, preferably up to 9 mass % and, most preferably, up to 8 mass %.

$Li_2O$, $Na_2O$, $K_2O$ and $Cs_2O$ are effective for improving melting property and defoaming property of the glass. $Li_2O$, therefore, may be added in an amount up to 1.0 mass %, preferably up to 0.8 mass % and, most preferably, up to 0.5 mass %. $Na_2O$ and $K_2O$ may be added respectively in an amount up to 3.0 mass %, preferably up to 2.5 mass % and, most preferably, up to 2.0 mass %. $Cs_2O$ may be added in an amount up to 5 mass %, preferably up to 4 mass % and, most preferably, up to 3 mass %. Addition of these ingredients in an excessive amount is undesirable because it makes the glass intable and generates devitrification.

$Tl_2O$ is effective for improving melting property, reducing photoelastic constant and adjusting refractive index and Abbe number and may be optionally added. If the amount of this ingredient exceeds 15 mass %, the glass is colored significantly and, therefore, may be added in an amount up to 15 mass %, preferably up to 14 mass % and, most preferably, up to 13 mass %.

$SiO_2$ and $B_2O_3$ are effective for adjusting refractive index and improving mechanical strength of the glass but increase photoelastic constant significantly and, therefore, may be added in an amount up to 3 mass % and preferably up to 2 mass %. Most preferably, these ingredients should not be added at all.

For refining and homogenizing the optical glass of the invention, $Sb_2O_3$ which is a known refining agent may be added as an optional ingredient. In addition to this effect, this ingredient can adjust refractive index and photoelastic constant and, therefore, may be added in an amount up to 3.0 mass %. Addition of this ingredient in an excessive amount is undesirable because it enhances excessive bubbling during melting of the glass.

The optical glasses of the fourth aspect and the fifth aspect have almost equivalent ranges of glass composition. For example, $Ba_2(PO_3)_2$ is decomposed into BaO and $P_2O_5$ during melting of the glass at a high temperature. The optical glasses of the fourth aspect is described on the basis of complex salts and fluorides while the optical glasses of the fifth aspect is described on the basis of oxides which are produced by vitrification reaction.

In the description of the optical glasses of the fifth aspect, "composition calculated on oxide basis" means a composition which, on the assumption that complex salts and fluorides etc. used as glass constituent ingredients are all decomposed and converted to oxides during melting of the glass, indicates amounts of respective ingredients contained in the glass with the total weight of the oxides produced being indicated as 100 mass %.

Reasons for limiting the respective ingredients of the optical glass of the fifth aspect are as follows: As to ingredients which overlap with the ingredients of the first, second, third and fourth aspects, the foregoing description will apply.

$P_2O_5$ is a glass forming oxide and an essential ingredient in the optical glass of this aspect. For forming a stable glass, this ingredient must be added in an amount of 12 mass % or over but if the amount of this ingredient is 22 mass % or over, a desired photoelastic constant cannot be realized. The amount of this ingredient, therefore, should be 12 mass % or over, preferably 13 mass % or over and, most preferably, be 14 mass % or over and should be less than 22 mass % or below, preferably 20 mass % or below and, most preferably, be 19 mass % or below.

$Al_2O_3$ is effective for facilitating forming of a stable glass and improving mechanical strength and chemical durability of the glass and, therefore, this ingredient should be added in an amount of 1 mass % or over. If, however, the amount of this ingredient exceeds 5 mass %, a desired photoelastic constant cannot be realized. The amount of this ingredient, therefore, should be 1 mass % or over, preferably 1.5 mass % or over and, most preferably, be 2 mass % or over and should be 5 mass % or below, preferably 4.5 mass % or below and, most preferably, be 4 mass % or below.

BaO is effective for reducing photoelastic constant and adjusting refractive index and Abbe number and, therefore, it is an essential ingredient in this glass. If the amount of this ingredient is less than 40 mass %, desired photoelastic constant and optical constants (i.e., refractive index and Abbe number) cannot be realized whereas if the amount of this ingredient exceeds 55 mass %, instability such as devitrification which is not desirable in the manufacture of the glass becomes significant. The amount of this ingredient, therefore, should be 40 mass % or over, preferably 41 mass % or over and, most preferably, be 42 mass % or over and should be less than 55 mass % or below, preferably 54 mass % or below and, most preferably, be 53 mass % or below.

The effects of F (fluorine) in this glass is the same as described previously. If a total amount of F contained in a fluoride or fluorides of a metal element or elements contained in the oxides to 100 weight parts of the composition calculated on the oxide basis is less than 8 weight parts, a stable glass cannot be obtained whereas if the total amount of F exceeds 20 weight parts, a desired refractive index cannot be realized. The total amount of F, therefore, should be 8 weight parts or over, preferably 9 weight parts or over and, most preferably, be 10 weight parts or over and should be less than 20 weight parts or below, preferably 19 weight parts or below and, most preferably, be 18 weight parts or below.

MgO (as raw materials of MgO, $MgF_2$, $Mg(PO_3)_2$, $MgCO_3$, MgO etc. are used) significantly increases photoelastic constant of the glass and, therefore, should preferably not be added. Since, however, this ingredient is effective for improving chemical durability and mechanical strength of the glass and adjusting thermal expansion coefficient, this ingredient may be added in an amount up to 1 mass % as MgO.

According to the sixth aspect of the invention, wavelength dependency is extremely small and amounts of birefringency at respective wavelengths are uniform and, therefore effects of refringency on characteristics of the product need not be considered in the optical design of the product.

According to the seventh aspect of the invention, amount of refringency produced by mechanical and thermal stresses is small and, therefore designed optical characteristics can be realized accurately and optical parts such as lenses, prisms and substrates which can be subjected to a high-precision polarization control can be realized. Wavelength dependency of photoelastic constant is important for optical parts which function over the entire visible range.

According to the eighth aspect of the invention, by optimizing values of photoelastic constant and refractive index in the optical glass of the seventh aspect, the effects of the optical glass of the seventh aspect can be obtained and, particularly, optical parts such as lenses, prisms and substrates for which a high precision polarization control is required can be realized.

In the optical glasses of the present invention, the amount of a Pb compound should be less than 0.1 mass % to the entire mass of the glass and, preferably it should not be contained at all.

EXAMPLES

Examples of the invention will now be described.

Tables 1 and 2 describing glass compositions according to the second aspect of the invention, Tables 3 and 4 describing glass compositions according to the fourth aspect of the invention and Tables 5 and 6 describing glass compositions according to the fifth aspect of the invention show preferred examples (Example No. 1 to Example No. 18) for obtaining optical glasses having a refractive index (nd) within a range from 1.60 to 1.68, Abbe number (v d) within a range from 40 to less than 65 and photoelastic constant (β) at wavelength of 546 nm within a range from $-0.1 \times 10^{-5}$ nm·cm$^{-1}$·Pa$^{-1}$ to $-0.5 \times 10^{-5}$ nm·cm$^{-1}$·Pa$^{-1}$. Table 7 describing glass compositions of comparative examples corresponding to the optical glasses of the second aspect of the invention, Table 8 describing glass compositions of comparative examples corresponding to the optical glasses of the fourth aspect of the invention and Table 9 describing glass compositions of comparative examples corresponding to the optical glasses of the fifth aspect of the invention show compositions and refractive index (nd), Abbe number (v d) and photoelastic constant (β) of known optical glasses of comparative examples (Comparative Example A to Comparative Example I). In Tables 1–3 and Tables 4–6, the same example numbers indicate the samples having the same compositions.

TABLE 1

| Element (mol %) | 1 | 2 | 3 | 4 | 5 | 6 | 7 | 8 | 9 |
|---|---|---|---|---|---|---|---|---|---|
| P | 8.74 | 8.14 | 7.88 | 8.05 | 8.82 | 7.45 | 7.84 | 9.47 | 8.37 |
| Al | 2.15 | 2.12 | 2.04 | 2.02 | 2.17 | 1.88 | 2.03 | 2.15 | 2.09 |
| Ba | 11.28 | 9.51 | 10.53 | 10.67 | 10.26 | 9.74 | 10.47 | 10.32 | 10.18 |
| Gd | 1.99 | 3.25 | 3.78 | 3.52 | 2.73 | 3.33 | 3.76 | 2.73 | 3.70 |
| Nb | 1.12 | 0.53 | 0.72 | 0.84 | 1.13 | 0.55 | 0.72 | 1.12 | 0.28 |
| F | 24.41 | 26.73 | 26.13 | 26.06 | 22.40 | 27.38 | 26.60 | 21.75 | 28.07 |
| O | 46.63 | 44.86 | 45.30 | 45.31 | 48.05 | 44.23 | 44.80 | 48.75 | 44.14 |
| Y | 0.78 | 1.25 | 0.75 | 0.75 | 1.67 | 1.28 | 0.75 | 1.00 | |
| La | 0.70 | 0.66 | 0.34 | 0.45 | 0.45 | 1.13 | 0.34 | 0.44 | 0.65 |
| Yb | | | | | 0.20 | | | | |
| Ta | | | | | | | | | |
| Lu | | | | | | | | 0.20 | |
| Ti | | | | | | | | | 0.47 |
| Zr | | 0.17 | | | | | | | |
| W | | | | 0.28 | | | | | |
| Bi | | | | | | | | 0.15 | |
| Ca | | 0.95 | 0.88 | 0.97 | | 0.98 | 0.98 | | 1.12 |
| Sr | 2.03 | 2.00 | 1.17 | 1.16 | 2.09 | 2.05 | 1.16 | 2.07 | 0.39 |
| Zn | | | | | | | | | |
| Li | | | | | | | | | 0.54 |
| Na | | | | | | | | | |
| K | | | 0.20 | 0.20 | | | 0.40 | | |
| Cs | | | | | | | | | |
| Tl | | | | | | | | | |
| Sb | | | | | 0.03 | | | | |
| Total | 100 | 100 | 100 | 100 | 100 | 100 | 100 | 100 | 100 |
| nd | 1.613 | 1.606 | 1.614 | 1.609 | 1.632 | 1.611 | 1.611 | 1.629 | 1.600 |
| vd | 60.1 | 64.0 | 60.9 | 61.6 | 59.1 | 64.5 | 60.8 | 58.7 | 62.4 |
| β: 436 nm (×10⁻⁵ nm · cm⁻¹ · Pa⁻¹) | 0.21 | 0.19 | 0.20 | 0.20 | 0.33 | 0.13 | 0.21 | 0.31 | 0.13 |
| β: 546 nm (×10⁻⁵ nm · cm⁻¹ · Pa⁻¹) | 0.17 | 0.15 | 0.16 | 0.16 | 0.29 | 0.10 | 0.18 | 0.27 | 0.09 |
| β: 644 nm (×10⁻⁵ nm · cm⁻¹ · Pa⁻¹) | 0.15 | 0.14 | 0.13 | 0.14 | 0.27 | 0.09 | 0.17 | 0.25 | 0.08 |

TABLE 2

| Element (mol %) | 10 | 11 | 12 | 13 | 14 | 15 | 16 | 17 | 18 |
|---|---|---|---|---|---|---|---|---|---|
| P | 7.41 | 8.42 | 7.84 | 8.69 | 7.53 | 7.79 | 7.84 | 8.79 | 8.72 |
| Al | 1.91 | 1.93 | 2.07 | 1.96 | 1.91 | 2.02 | 2.03 | 1.99 | 1.97 |
| Ba | 10.78 | 11.39 | 10.66 | 11.58 | 9.85 | 10.60 | 10.44 | 10.84 | 10.62 |
| Gd | 3.80 | 3.88 | 3.85 | 3.94 | 3.37 | 3.64 | 3.76 | 2.91 | 2.65 |
| Nb | 1.28 | 0.86 | 0.73 | 0.79 | 0.55 | 1.22 | 0.72 | 2.09 | 2.07 |
| F | 25.63 | 22.19 | 23.88 | 21.46 | 27.69 | 24.59 | 25.77 | 21.06 | 20.47 |
| O | 45.76 | 48.15 | 46.76 | 48.66 | 43.75 | 46.23 | 45.54 | 48.73 | 49.37 |
| Y | 0.76 | 1.04 | 0.98 | 1.05 | 1.29 | 0.74 | 0.75 | | |
| La | | 0.46 | 0.23 | 0.56 | 0.28 | | 0.25 | | |
| Yb | | | | | | | | | |
| Ta | | | | 0.20 | | | | | |
| Lu | | | | | | | | | |
| Ti | 0.50 | 0.50 | 0.50 | 0.51 | | 0.49 | 0.41 | 0.52 | 0.94 |
| Zr | | | | | | | | | |
| W | 0.28 | 0.18 | 0.28 | | | 0.21 | 0.28 | 0.18 | 0.33 |
| Bi | | | | | | | | | |
| Ca | 0.99 | 1.00 | 0.99 | | 0.99 | 0.97 | 0.98 | 1.03 | 1.02 |
| Sr | 0.90 | | 1.23 | 0.60 | 2.08 | 0.58 | 1.03 | | |
| Zn | | | | | 0.24 | | | | |
| Li | | | | | | | | | |
| Na | | | | | | 0.68 | | | |
| K | | | | | | | 0.20 | | |
| Cs | | | | | 0.15 | | | | |
| Tl | | | | | 0.56 | | | 1.86 | 1.84 |
| Sb | | | | | | | | | |
| Total | 100 | 100 | 100 | 100 | 100 | 100 | 100 | 100 | 100 |
| nd | 1.632 | 1.643 | 1.623 | 1.645 | 1.613 | 1.635 | 1.621 | 1.658 | 1.670 |
| vd | 55.2 | 56.2 | 58.3 | 56.5 | 63.8 | 55.0 | 58.2 | 48.6 | 45.6 |
| β: 436 nm (×10⁻⁵ nm · cm⁻¹ · Pa⁻¹) | 0.31 | 0.30 | 0.23 | 0.32 | 0.11 | 0.34 | 0.23 | 0.48 | 0.55 |

TABLE 2-continued

| Element (mol %) | 10 | 11 | 12 | 13 | 14 | 15 | 16 | 17 | 18 |
|---|---|---|---|---|---|---|---|---|---|
| β: 546 nm ($\times 10^{-5}$ nm · cm$^{-1}$ · Pa$^{-1}$) | 0.26 | 0.25 | 0.19 | 0.28 | 0.08 | 0.30 | 0.19 | 0.42 | 0.49 |
| β: 644 nm ($\times 10^{-5}$ nm · cm$^{-1}$ · Pa$^{-1}$) | 0.24 | 0.24 | 0.18 | 0.27 | 0.08 | 0.28 | 0.18 | 0.40 | 0.48 |

TABLE 3

| Ingredient (mass %) | 1 | 2 | 3 | 4 | 5 | 6 | 7 | 8 | 9 |
|---|---|---|---|---|---|---|---|---|---|
| Al(PO$_3$)$_3$ | 15.36 | 15.36 | 14.00 | 14.00 | 15.36 | 13.36 | 14.36 | 15.36 | 15.36 |
| Ba(PO$_3$)$_2$ | 9.40 | 7.40 | 7.40 | 8.76 | 9.40 | 7.40 | 7.40 | 12.40 | 9.50 |
| Total meta-phosphates | 24.76 | 22.76 | 21.40 | 22.76 | 24.76 | 20.76 | 21.76 | 27.76 | 24.86 |
| CaF$_2$ |  | 2.00 | 2.00 | 2.00 |  | 2.00 | 2.00 |  | 2.49 |
| SrF$_2$ | 6.93 | 6.93 | 4.00 | 4.00 | 6.93 | 6.93 | 4.00 | 6.93 | 1.38 |
| BaF$_2$ | 48.51 | 42.00 | 45.00 | 45.46 | 42.90 | 42.00 | 45.00 | 42.00 | 44.86 |
| YF$_3$ |  | 5.00 | 3.00 | 3.00 |  | 5.00 | 3.00 |  |  |
| LaF$_3$ |  |  |  |  |  |  |  |  | 2.56 |
| GdF$_3$ |  |  |  |  |  |  |  |  | 11.24 |
| Total fluorides | 55.44 | 55.93 | 54.50 | 54.96 | 49.83 | 55.93 | 54.96 | 48.93 | 62.52 |
| Y$_2$O$_3$ | 2.50 |  |  |  | 5.00 |  |  | 3.00 |  |
| La$_2$O$_3$ | 3.00 | 3.00 | 1.50 | 2.00 | 2.00 | 5.00 | 1.43 | 2.00 | 0.90 |
| Gd$_2$O$_3$ | 9.84 | 16.30 | 18.30 | 17.30 | 13.30 | 16.30 | 18.30 | 13.30 | 9.53 |
| Nb$_2$O$_5$ | 3.96 | 1.96 | 2.50 | 3.00 | 3.96 | 1.96 | 2.50 | 3.96 | 1.00 |
| Yb$_2$O$_3$ |  |  |  |  | 1.00 |  |  |  |  |
| Ta$_2$O$_5$ |  |  |  |  |  |  |  |  |  |
| Lu$_2$O$_3$ |  |  |  |  |  |  |  | 1.00 |  |
| TiO$_2$ |  |  |  |  |  |  |  |  | 1.00 |
| ZrO$_2$ | 0.50 |  |  |  |  |  |  |  |  |
| WO$_3$ |  |  | 1.75 |  |  |  |  |  |  |
| Bi$_2$O$_3$ |  |  |  |  |  |  |  | 1.00 |  |
| ZnO |  |  |  |  |  |  |  |  |  |
| KHF$_2$ |  |  | 0.50 | 0.50 |  |  | 0.96 |  |  |
| Li$_2$O |  |  |  |  |  |  |  |  | 0.20 |
| Na$_2$O |  |  |  |  |  |  |  |  |  |
| Cs$_2$O |  |  |  |  |  |  |  |  |  |
| Tl$_2$O |  |  |  |  |  |  |  |  |  |
| Sb$_2$O$_3$ |  |  |  |  | 0.10 |  |  |  |  |
| Total oxide raw materials | 19.80 | 21.26 | 24.55 | 22.80 | 25.36 | 23.26 | 24.19 | 23.26 | 12.63 |
| Total | 100 | 100 | 100 | 100 | 100 | 100 | 100 | 100 | 100 |
| nd | 1.613 | 1.606 | 1.614 | 1.609 | 1.632 | 1.611 | 1.611 | 1.629 | 1.600 |
| vd | 60.1 | 64.0 | 60.9 | 61.6 | 59.1 | 64.5 | 60.8 | 58.7 | 62.4 |
| β: 436 nm ($\times 10^{-5}$ nm · cm$^{-1}$ · Pa$^{-1}$) | 0.21 | 0.19 | 0.20 | 0.20 | 0.33 | 0.13 | 0.21 | 0.31 | 0.13 |
| β: 546 nm ($\times 10^{-5}$ nm · cm$^{-1}$ · Pa$^{-1}$) | 0.17 | 0.15 | 0.16 | 0.16 | 0.29 | 0.10 | 0.18 | 0.27 | 0.09 |
| β: 644 nm ($\times 10^{-5}$ nm · cm$^{-1}$ · Pa$^{-1}$) | 0.15 | 0.14 | 0.13 | 0.14 | 0.27 | 0.09 | 0.17 | 0.25 | 0.08 |

TABLE 4

| Ingredient (mass %) | 10 | 11 | 12 | 13 | 14 | 15 | 16 | 17 | 18 |
|---|---|---|---|---|---|---|---|---|---|
| Al(PO$_3$)$_3$ | 13.00 | 13.30 | 14.00 | 13.40 | 13.36 | 14.00 | 14.00 | 13.30 | 13.40 |
| Ba(PO$_3$)$_2$ | 7.40 | 10.40 | 7.40 | 10.40 | 7.40 | 7.40 | 7.40 | 10.40 | 10.40 |
| Total meta-phosphates | 20.40 | 23.70 | 21.40 | 23.80 | 20.76 | 21.40 | 21.40 | 23.70 | 23.80 |
| CaF$_2$ | 2.00 | 2.00 | 2.00 |  | 2.00 | 2.00 | 2.00 | 2.00 | 2.00 |
| SrF$_2$ | 3.00 |  | 4.00 | 2.00 | 6.93 | 2.00 | 3.50 |  |  |
| BaF$_2$ | 46.00 | 46.00 | 45.00 | 46.00 | 42.00 | 46.00 | 45.00 | 42.00 | 41.00 |

TABLE 4-continued

| Ingredient (mass %) | 10 | 11 | 12 | 13 | 14 | 15 | 16 | 17 | 18 |
|---|---|---|---|---|---|---|---|---|---|
| $YF_3$ | 3.00 | | 3.00 | | 5.00 | 3.00 | 3.00 | | |
| $LaF_3$ | | | | | | | | | |
| $GdF_3$ | | | | | | | | | |
| Total fluordes | 54.00 | 48.00 | 54.00 | 48.00 | 55.93 | 53.00 | 54.00 | 44.00 | 43.00 |
| $Y_2O_3$ | | 3.00 | | 3.00 | | | | | |
| $La_2O_3$ | | 2.00 | 1.00 | 2.30 | 1.50 | | 1.00 | | |
| $Gd_2O_3$ | 18.30 | 18.30 | 18.35 | 18.20 | 16.30 | 17.90 | 18.40 | 13.30 | 12.30 |
| $Nb_2O_5$ | 4.50 | 3.00 | 2.50 | 2.70 | 1.96 | 4.40 | 2.50 | 7.00 | 7.00 |
| $Yb_2O_3$ | | | | | | | | | |
| $Ta_2O_5$ | | | | 1.00 | | | | | |
| $Lu_2O_3$ | | | | | | | | | |
| $TiO_2$ | 1.00 | 1.00 | 1.00 | 0.96 | | 1.00 | 1.00 | 1.00 | 1.90 |
| $ZrO_2$ | | | | | | | | | |
| $WO_3$ | 1.75 | 1.00 | 1.70 | | | 1.30 | 1.70 | 1.00 | 2.00 |
| $Bi_2O_3$ | | | | | | | | | |
| ZnO | | | | | | 0.50 | | | |
| $KHF_2$ | | | | | | | 0.50 | | |
| $Li_2O$ | | | | | | | | | |
| $Na_2O$ | | | | | | 0.50 | | | |
| $Cs_2O$ | | | | | 0.50 | | | | |
| $Tl_2O$ | | | | | 3.00 | | | 10.00 | 10.00 |
| $Sb_2O_3$ | | | | | | | | | |
| Total oxide raw materials | 25.55 | 28.30 | 24.55 | 28.16 | 23.26 | 25.60 | 25.10 | 32.30 | 33.20 |
| Total | 100 | 100 | 100 | 100 | 100 | 100 | 100 | 100 | 100 |
| nd | 1.632 | 1.643 | 1.623 | 1.645 | 1.613 | 1.635 | 1.621 | 1.658 | 1.670 |
| νd | 55.2 | 56.2 | 58.3 | 56.5 | 63.8 | 55.0 | 58.2 | 48.6 | 45.6 |
| β: 436 nm ($\times 10^{-5}$ nm · cm$^{-1}$ · Pa$^{-1}$) | 0.31 | 0.30 | 0.23 | 0.32 | 0.11 | 0.34 | 0.23 | 0.48 | 0.55 |
| β: 546 nm ($\times 10^{-5}$ nm · cm$^{-1}$ · Pa$^{-1}$) | 0.26 | 0.25 | 0.19 | 0.28 | 0.08 | 0.30 | 0.19 | 0.42 | 0.49 |
| β: 644 nm ($\times 10^{-5}$ nm · cm$^{-1}$ · Pa$^{-1}$) | 0.24 | 0.24 | 0.18 | 0.27 | 0.08 | 0.28 | 0.18 | 0.40 | 0.48 |

TABLE 5

| Ingredient (mass %) | 1 | 2 | 3 | 4 | 5 | 6 | 7 | 8 | 9 |
|---|---|---|---|---|---|---|---|---|---|
| $P_2O_5$ | 18.30 | 17.40 | 16.10 | 16.80 | 18.10 | 15.60 | 16.40 | 19.60 | 18.50 |
| $Al_2O_3$ | 3.20 | 3.20 | 3.00 | 3.00 | 3.10 | 2.80 | 3.00 | 3.10 | 3.30 |
| BaO | 51.00 | 44.20 | 46.90 | 48.10 | 45.30 | 44.10 | 46.90 | 46.10 | 48.20 |
| $Gd_2O_3$ | 10.60 | 17.80 | 20.00 | 18.80 | 14.30 | 17.80 | 20.00 | 14.30 | 20.80 |
| $Nb_2O_5$ | 4.30 | 2.10 | 2.70 | 3.20 | 4.30 | 2.20 | 2.80 | 4.30 | 1.20 |
| $Y_2O_3$ | 2.60 | 4.30 | 2.50 | 2.50 | 5.40 | 4.30 | 2.50 | 3.20 | |
| $La_2O_3$ | 3.30 | 3.20 | 1.60 | 2.20 | 2.10 | 5.40 | 1.60 | 2.10 | 3.30 |
| $Yb_2O_3$ | | | | | 1.10 | | | | |
| $Ta_2O_5$ | | | | | | | | | |
| $Lu_2O_3$ | | | | | | | | 1.10 | |
| $TiO_2$ | | | | | | | | | 1.20 |
| $ZrO_2$ | 0.60 | | | | | | | | |
| $WO_3$ | | | 1.90 | | | | | | |
| $Bi_2O_3$ | | | | | | | 1.00 | | |
| CaO | | 1.60 | 1.50 | 1.60 | | 1.60 | 1.60 | | 2.00 |
| SrO | 6.10 | 6.20 | 3.50 | 3.60 | 6.20 | 6.20 | 3.60 | 6.20 | 1.30 |
| ZnO | | | | | | | | | |
| $Li_2O$ | | | | | | | | | 0.20 |
| $Na_2O$ | | | | | | | | | |
| $K_2O$ | | | 0.30 | 0.20 | | | 0.60 | | |
| $Cs_2O$ | | | | | | | | | |
| $Tl_2O$ | | | | | | | | | |
| $Sb_2O_3$ | | | | | 0.10 | | | | |
| Total | 100 | 100 | 100 | 100 | 100 | 100 | 100 | 100 | 100 |
| F | 13.60 | 15.30 | 14.40 | 14.50 | 12.20 | 15.30 | 14.80 | 12.00 | 16.60 |
| nd | 1.613 | 1.606 | 1.614 | 1.609 | 1.632 | 1.611 | 1.611 | 1.629 | 1.600 |
| νd | 60.1 | 64.0 | 60.9 | 61.6 | 59.1 | 64.5 | 60.8 | 58.7 | 62.4 |
| β: 436 nm ($\times 10^{-5}$ nm · cm$^{-1}$ · Pa$^{-1}$) | 0.21 | 0.19 | 0.20 | 0.20 | 0.33 | 0.13 | 0.21 | 0.31 | 0.13 |

TABLE 5-continued

| Ingredient (mass %) | 1 | 2 | 3 | 4 | 5 | 6 | 7 | 8 | 9 |
|---|---|---|---|---|---|---|---|---|---|
| β: 546 nm ($\times 10^{-5}$ nm·cm$^{-1}$·Pa$^{-1}$) | 0.17 | 0.15 | 0.16 | 0.16 | 0.29 | 0.10 | 0.18 | 0.27 | 0.09 |
| β: 644 nm ($\times 10^{-5}$ nm·cm$^{-1}$·Pa$^{-1}$) | 0.15 | 0.14 | 0.13 | 0.14 | 0.27 | 0.09 | 0.17 | 0.25 | 0.08 |

TABLE 6

| Ingredient (mass %) | 10 | 11 | 12 | 13 | 14 | 15 | 16 | 17 | 18 |
|---|---|---|---|---|---|---|---|---|---|
| $P_2O_5$ | 15.20 | 16.80 | 15.80 | 16.80 | 15.60 | 16.00 | 16.10 | 16.80 | 16.70 |
| $Al_2O_3$ | 2.70 | 2.80 | 2.90 | 2.70 | 2.80 | 2.90 | 3.00 | 2.70 | 2.80 |
| BaO | 47.60 | 48.70 | 46.40 | 48.60 | 44.10 | 47.50 | 46.90 | 44.80 | 43.80 |
| $Gd_2O_3$ | 19.80 | 19.60 | 19.80 | 19.50 | 17.70 | 19.30 | 19.90 | 14.10 | 13.00 |
| $Nb_2O_5$ | 4.90 | 3.20 | 2.70 | 2.90 | 2.20 | 4.80 | 2.70 | 7.40 | 7.40 |
| $Y_2O_3$ | 2.50 | 3.20 | 3.20 | 3.20 | 4.30 | 2.50 | 2.50 | | |
| $La_2O_3$ | | 2.10 | 1.10 | 2.40 | 1.40 | | 1.10 | | |
| $Yb_2O_3$ | | | | | | | | | |
| $Ta_2O_5$ | | | | 1.10 | | | | | |
| $Lu_2O_3$ | | | | | | | | | |
| $TiO_2$ | 1.10 | 1.00 | 1.10 | 1.00 | | 1.10 | 1.00 | 1.00 | 2.10 |
| $ZrO_2$ | | | | | | | | | |
| $WO_3$ | 1.90 | 1.10 | 1.90 | | | 1.40 | 1.80 | 1.10 | 2.10 |
| $Bi_2O_3$ | | | | | | | | | |
| CaO | 1.60 | 1.50 | 1.50 | | 1.60 | 1.50 | 1.60 | 1.50 | 1.50 |
| SrO | 2.70 | | 3.60 | 1.80 | 6.20 | 1.80 | 3.10 | | |
| ZnO | | | | | | 0.60 | | | |
| $Li_2O$ | | | | | | | | | |
| $Na_2O$ | | | | | | 0.60 | | | |
| $K_2O$ | | | | | | | | 0.30 | |
| $Cs_2O$ | | | | 0.60 | | | | | |
| $Tl_2O$ | | | | 3.50 | | | | 10.60 | 10.60 |
| $Sb_2O_3$ | | | | | | | | | |
| Total | 100 | 100 | 100 | 100 | 100 | 100 | 100 | 100 | 100 |
| F | 14.10 | 11.70 | 12.90 | 11.10 | 15.30 | 13.60 | 14.40 | 10.70 | 10.50 |
| nd | 1.632 | 1.643 | 1.623 | 1.645 | 1.613 | 1.635 | 1.621 | 1.658 | 1.670 |
| vd | 55.2 | 56.2 | 58.3 | 56.5 | 63.8 | 55.0 | 58.2 | 48.6 | 45.6 |
| β: 436 nm ($\times 10^{-5}$ nm·cm$^{-1}$·Pa$^{-1}$) | 0.31 | 0.30 | 0.23 | 0.32 | 0.11 | 0.34 | 0.23 | 0.48 | 0.55 |
| β: 546 nm ($\times 10^{-5}$ nm·cm$^{-1}$·Pa$^{-1}$) | 0.26 | 0.25 | 0.19 | 0.28 | 0.08 | 0.30 | 0.19 | 0.42 | 0.49 |
| β: 644 nm ($\times 10^{-5}$ nm·cm$^{-1}$·Pa$^{-1}$) | 0.24 | 0.24 | 0.18 | 0.27 | 0.08 | 0.28 | 0.18 | 0.40 | 0.48 |

For measuring photoelastic constant (β), glass samples were formed to disks each of which has diameter of 25 mm and thickness of 8 mm and is polished on opposite surfaces, compressive load was applied to the disks in a predetermined direction, optical path difference caused in the center of the glass was measured, and the photoelastic constant was calculated by using the above described formula (1). As light sources for measuring photoelastic constants at 436 nm and 546 nm, a very high pressure mercury lamp was used and as light source for measuring photoelastic constant at 644 nm, a halogen lamp was used.

For producing the glasses of Example No. 1 to Example No. 18, ordinary raw materials for optical glasses such as metaphosphate compound, oxides, carbonates, nitrates, fluorides and hydroxides were weighed and mixed at a predetermined ratio and mixed materials were put in a platinum crucible and melted at a temperature within a range from 900° C. to 1200° C. for three to four hours depending upon melting property of the glass composition. The melt was stirred and thereby homogenized and then, after the temperature was lowered to a proper temperature, the melt was cast into a mold and annealed to provide the glasses. When necessary, a lid was placed on the crucible during melting to prevent evaporation of fluorine.

The glasses of Example No. 1 to Example No. 18 all had a refractive index (nd) within a range from 1.60 to 1.68, an Abbe number (ν d) within a range from 40 to less than 65 and an photoelastic constant within a range from $^-0.1\times10^{-5}$ nm·cm$^{-1}$·Pa$^{-1}$ to 0.5×10$^{\times 5}$ nm·cm$^{-1}$·Pa$^{-1}$. Particularly, the glasses of Example No. 1 to Example No. 16 had an photoelastic constant (β) within a range from $-0.1\times10^{-5}$ nm·cm$^{-1}$·Pa$^{-1}$ to 0.3×10$^{-5}$ nm·cm$^{-1}$·Pa $^{-1}$, realizing optical glasses of an extremely small photoelastic constant.

FIG. 1 plots values of photoelastic constant of the respective examples obtained when incident light of 644 nm and 436 nm were employed. As will be apparent from FIG. 1, difference between the photoelastic constant at 644 nm and the photoelastic constant at 436 nm was of a very small value within a range from $-0.1\times10^{-5}$ nm·cm$^{-1}$·Pa$^{-1}$ to 0.1×10$^{-5}$ nm·cm$^{-1}$·Pa$^{-1}$.

On the other hand, for examining photoelastic constants of known fluoro-phosphate optical glasses, glasses of Comparative Examples A to I of Tables 7–9 were prepared to test their properties. In Tables 7–9, the same comparative example numbers indicate the samples having the same compositions.

Comparative Examples A and B are Example Nos. 14 and 22 of Japanese Patent Application Laid-open Publication No. Hei11-60267, Comparative Examples C and D are Example Nos. 14 and 24 of Japanese Patent Application Laid-open Publication No. Sho 50-50416, Comparative Example E is Example No. 24 of Japanese Patent Application Laid-open Publication No. Sho 57-123842, Comparative Examples F and G are Example. Nos. 7 and 22 of Japanese Patent Application Laid-open Publication No. Sho 59-18133, Comparative Example H is Example No. 6 of Japanese Patent Application Laid-open Publication No. Hei 10-53434, and Comparative Example I is Example No. 47 of U.S. Pat. No. 5,969,861. Table 7 described glass compositions of optical glasses corresponding to optical glasses of the second aspect of the invention (the same description as in the respective publications). Table 8 described glass compositions of optical glasses corresponding to the optical glasses of the fourth aspect of the invention. Table 9 described glass compositions of optical glasses corresponding to the optical glasses of the fifth aspect of the invention.

In Comparative Examples B and C, devitirification occurred during cooling of the glasses and transparent glasses could not be obtained and, as a result, physical properties of these glasses could not be measured. This result in Comparative Examples B and C is indicated by the mark X in Tables 7–9. In the other comparative examples, refractive index (nd) was in the vicinity of 1.60 and Abbe number was in the vicinity of 60 but photoelastic constant in these comparative examples except for Comparative Examples A, E and H was larger than $0.5 \times 10^{-5}$ $nm \cdot cm^{-1} \cdot Pa^{-1}$ which is by far different from the desired photoelastic constant in the present invention. Compared with photoelastic constant of general optical glasses which is about $2.0 \times 10^{-5}$ $nm \cdot cm^{-1} \cdot Pa^{-1}$ to $3.0 \times 10^{-5}$ $nm \cdot cm^{-1} \cdot Pa^{-1}$, the photoelastic constant of these comparative examples may be said to be relatively small but, for purposes such as a polarizing beam splitter which requires a high precision polarization control, photoelastic constant should be as near to zero as possible and, from this standpoint, the photoelastic constant of these comparative examples is far from being sufficient.

Comparative Examples A and E show optical constants (refractive index nd and Abbe number ν d) which differ widely from the desired ranges of the present invention. If an attempt is made to produce a polarizing beam splitter by using these glasses, it will be very difficult to obtain a good polarizing separation characteristic in preparing a polarizing separation film.

In Comparative Example H, in case refractive index (nd) is within a range from 1.60 to 1.62, photoelastic constant (β) should preferably be within a range from $-0.1 \times 10^{-5}$ $nm \cdot cm^{-1} \cdot Pa^{-1}$ to $0.4 \times 10^{-5}$ $nm \cdot cm^{-1} \cdot Pa^{-1}$ and this value of photoelastic constant is not sufficient for practical purposes. For example, comparing Example Nos. 2 and 4 which have about the same refractive index with Comparative Example H, Comparative Example H has photoelastic constant which is more than double that of Example Nos. 2 and 4 and, when the glass of Comparative Example H is used as an optical element, undesirable birefringency tends to take place as compared with optical elements made of the optical glasses of Example Nos. 2 and 4.

The fluoro-phosphate glass of Comparative Example I is described in the publication to have refractive index (nd) of 1.527, Abbe number (v d) of 72.8 and photoelastic constant at He-Ne laser wavelength (633 nm) of $0.43 \times 10^{-8}$ cm/N ($=0.43 \times 10^{-5}$ $nm \cdot cm^{-1} \cdot Pa^{-1}$). Result of a confirmation test, however, shows that fine devitrification or phase separation occurred and a transparent glass could not be obtained, i.e., the glass exhibited an opaque appearance. Physical properties were measured in this opaque glass but, as shown in Tables 7–9, optical properties which were near to the values described in the publication could not be obtained. In Tables 7–9, the mark Δ indicates that Abbe number could not be measured.

The above described examples of the invention are listed for illustrative purpose only and the present invention is not limited to these examples. Various modifications may be made by those skilled in the art without departing from the spirit and scope of the present invention.

TABLE 7

| Element (mol %) | A | B | C | D | E | F | G | H | I |
|---|---|---|---|---|---|---|---|---|---|
| P | 10.50 | 10.73 | 15.77 | 11.90 | 10.80 | 11.36 | 9.72 | 13.18 | 7.82 |
| Al | 2.89 | 3.60 | 2.06 | 3.83 | 2.23 | 2.05 | 3.90 | 3.04 | 3.49 |
| Ba | 11.27 | 11.21 | 13.07 | 8.00 | 10.24 | 8.80 | 9.50 | 12.04 | 2.98 |
| Gd | 0.74 | 0.92 | | | | | | | |
| Nb | | | | 1.39 | | | | | |
| F | 20.71 | 15.10 | 3.73 | 15.30 | 19.73 | 12.53 | 18.88 | 12.43 | 31.91 |
| O | 49.02 | 51.71 | 60.48 | 53.30 | 49.50 | 54.09 | 49.82 | 54.67 | 41.37 |
| Mg | 2.16 | 5.52 | 4.55 | 3.00 | 1.85 | 3.86 | 3.03 | 3.32 | 2.98 |
| Ca | 0.34 | 0.84 | 0.24 | 0.21 | 0.93 | 1.82 | | 0.40 | 2.38 |
| Sr | | | | 2.99 | 1.86 | | | | 1.85 |
| Y | 2.37 | 0.32 | | | 2.24 | | 1.12 | 0.92 | |
| La | | | 0.10 | 0.08 | | | | | 0.35 |
| Yb | | | | | | 0.62 | 0.91 | 0.96 | |
| B | | | | | | 4.31 | 1.80 | | |
| Zn | | | | | | | 0.27 | 1.27 | 3.91 |
| Sb | | 0.05 | | | | | | | |
| Si | | | | | | | | | 0.96 |
| Total | 100 | 100 | 100 | 100 | 100 | 100 | 100 | 100 | 100 |
| nd | 1.595 | x | x | 1.611 | 1.595 | 1.619 | 1.606 | 1.607 | 1.573 |
| vd | 68.0 | x | x | 57.8 | 67.3 | 63.8 | 65.3 | 65.3 | Δ |
| β: 436 nm ($\times 10^{-5}$ $nm \cdot cm^{-1} \cdot Pa^{-1}$) | 0.34 | x | x | 0.87 | 0.38 | 0.85 | 0.84 | 0.48 | 1.46 |
| β: 546 nm | 0.30 | x | x | 0.83 | 0.34 | 0.77 | 0.76 | 0.45 | 1.43 |

TABLE 7-continued

| Element (mol %) | A | B | C | D | E | F | G | H | I |
|---|---|---|---|---|---|---|---|---|---|
| (×10$^{-5}$ nm · cm$^{-1}$ · Pa$^{-1}$) | | | | | | | | | |
| β: 644 nm | 0.30 | x | x | 0.81 | 0.33 | 0.77 | 0.76 | 0.44 | 1.37 |
| (×10$^{-5}$ nm · cm$^{-1}$ · Pa$^{-1}$) | | | | | | | | | |

TABLE 8

| Ingredient (mass %) | A | B | C | D | E | F | G | H | I |
|---|---|---|---|---|---|---|---|---|---|
| Al(PO$_3$)$_3$ | 18.00 | 15.00 | 9.30 | 9.30 | 17.55 | 18.00 | 20.00 | 24.08 | |
| Mg(PO$_3$)$_2$ | | | 22.50 | 16.50 | | | | | |
| Ca(PO$_3$)$_2$ | 2.00 | 5.50 | | | 5.48 | 12.00 | | 2.41 | |
| Ba(PO$_3$)$_2$ | 13.00 | 15.00 | 14.80 | 14.80 | 9.80 | 5.00 | | 14.37 | |
| Zn(PO$_3$)$_2$ | | | | | | 2.00 | 9.00 | | 36.10 |
| AlF$_3$ | 1.50 | 4.30 | 2.00 | 7.50 | | | 4.00 | | 12.10 |
| MgF$_2$ | 4.00 | 2.60 | 0.44 | 0.44 | 3.45 | 8.00 | 6.00 | 6.19 | 7.70 |
| CaF$_2$ | | | 0.53 | 0.53 | | | | | 7.70 |
| SrF$_2$ | | | | 12.20 | 6.95 | | | | 9.60 |
| BaF$_2$ | 30.00 | 19.00 | | | 32.05 | 14.00 | 23.00 | 15.29 | 21.60 |
| YF$_3$ | 4.50 | | | | | | | | |
| LaF$_3$ | | | 0.53 | 0.53 | | | | | 2.80 |
| Y2O$_3$ | 4.50 | 1.10 | | | 7.51 | | 4.00 | 3.13 | |
| Gd2O3 | 4.00 | 5.00 | | | | | | | |
| MgO | | 5.00 | | | | | | | |
| BaO | 18.50 | 27.30 | 49.90 | 32.20 | 13.58 | 30.00 | 26.00 | 34.53 | |
| Sb$_2$O$_3$ | | 0.20 | | | | | | | |
| SiO$_2$ | | | | | | | | | 2.40 |
| B$_2$O$_3$ | | | | | | 5.00 | 2.00 | | |
| Nb$_2$O$_5$ | | | | 6.00 | | | | | |
| Yb$_2$O$_3$ | | | | | 3.63 | 6.00 | 6.00 | | |
| Total | 100 | 100 | 100 | 100 | 100 | 100 | 100 | 100 | 100 |
| nd | 1.595 | x | x | 1.611 | 1.595 | 1.619 | 1.606 | 1.607 | 1.573 |
| νd | 68.0 | x | x | 57.8 | 67.3 | 63.8 | 65.3 | 65.3 | Δ |
| β: 436 nm (×10$^{-5}$ nm · cm$^{-1}$ · Pa$^{-1}$) | 0.34 | x | x | 0.87 | 0.38 | 0.85 | 0.84 | 0.48 | 1.46 |
| β: 546 nm (×10$^{-5}$ nm · cm$^{-1}$ · Pa$^{-1}$) | 0.30 | x | x | 0.83 | 0.34 | 0.77 | 0.76 | 0.45 | 1.43 |
| β: 644 nm (×10$^{-5}$ nm · cm$^{-1}$ · Pa$^{-1}$) | 0.30 | x | x | 0.81 | 0.33 | 0.77 | 0.76 | 0.44 | 1.37 |

TABLE 9

| Ingredient (mass %) | A | B | C | D | E | F | G | H | I |
|---|---|---|---|---|---|---|---|---|---|
| P$_2$O$_5$ | 23.80 | 24.20 | 32.50 | 29.10 | 24.40 | 28.10 | 23.40 | 29.26 | 26.80 |
| Al$_2$O$_3$ | 4.70 | 5.80 | 3.10 | 6.70 | 3.60 | 3.60 | 6.73 | 4.85 | 8.60 |
| BaO | 55.20 | 54.70 | 58.30 | 42.20 | 49.90 | 47.00 | 49.36 | 57.74 | 22.10 |
| Gd$_2$O$_3$ | 4.30 | 5.30 | | | | | | | |
| Nb$_2$O$_5$ | | | | 6.30 | | | | | |
| MgO | 2.80 | 7.10 | 5.30 | 4.20 | 2.40 | 5.40 | 4.15 | 4.18 | 5.80 |
| CaO | 0.60 | 1.50 | 0.40 | 0.40 | 1.70 | 3.60 | | 0.71 | 6.50 |
| SrO | | | | 10.60 | 6.10 | | | | 9.30 |
| Y$_2$O$_3$ | 8.60 | 1.20 | | | 8.00 | | 4.28 | 3.26 | |
| La$_2$O$_3$ | | | 0.40 | 0.50 | | | | | 2.70 |
| Yb$_2$O$_3$ | | | | | 3.90 | 6.30 | 6.43 | | |
| B$_2$O$_3$ | | | | | | 5.20 | 2.14 | | |
| ZnO | | | | | | 0.80 | 3.51 | | 15.40 |
| Sb2O$_3$ | | 0.20 | | | | | | | |
| SiO$_2$ | | | | | | | | | 2.80 |
| Total | 100 | 100 | 100 | 100 | 100 | 100 | 100 | 100 | 100 |
| F | 12.60 | 9.10 | 2.10 | 10.00 | 11.90 | 8.30 | 12.16 | 7.39 | 29.30 |
| nd | 1.595 | x | x | 1.611 | 1.595 | 1.619 | 1.606 | 1.607 | 1.573 |
| νd | 68.0 | x | x | 57.8 | 67.3 | 63.8 | 65.3 | 65.3 | Δ |
| β: 436 nm (×10$^{-5}$ nm · cm$^{-1}$ · Pa$^{-1}$) | 0.34 | x | x | 0.87 | 0.38 | 0.85 | 0.84 | 0.48 | 1.46 |

TABLE 9-continued

| Ingredient (mass %) | A | B | C | D | E | F | G | H | I |
|---|---|---|---|---|---|---|---|---|---|
| β: 546 nm ($\times 10^{-5}$ nm · cm$^{-1}$ · Pa$^{-1}$) | 0.30 | x | x | 0.83 | 0.34 | 0.77 | 0.76 | 0.45 | 1.43 |
| β: 644 nm ($\times 10^{-5}$ nm · cm$^{-1}$ · Pa$^{-1}$) | 0.30 | x | x | 0.81 | 0.33 | 0.77 | 0.76 | 0.44 | 1.37 |

What is claimed is:

1. An optical glass having a refractive index (nd) within a range from 1.60 to 1.68 and an Abbe number (ν d) within a range from 40 to less than 65 and comprising, as atoms constituting the optical glass,

| P | 5–10 mol % |
|---|---|
| Al | 1–3 mol % |
| Ba | 8–13 mol %, |
| Gd | 1–5 mol % |
| Nb | 0.1–3 mol % |
| F | 15–35 mol % and |
| O | 40–52 mol %, | and being free of a Pb compound.

2. An optical glass having a refractive index (nd) within a range from 1.60 to 1.68 and an Abbe number (ν d) within a range rfrom 40 to less than 65 and comprising, as atoms constituting the optical glass,

| P | 5–10 mol % |
|---|---|
| Al | 1–3 mol % |
| Ba | 8–13 mol % |
| Gd | 1–5 mol % |
| Nb | 0.1–3 mol % |
| F | 15–35 mol % |
| O | 40–52 mol % and |
| Y | 0–2 mol % and/or |
| La | 0–2 mol % and/or |
| Yb | 0–1 mol % and/or |
| Ta | 0–1 mol % and/or |
| Lu | 0–1 mol % and/or |
| Ti | 0–1.5 mol % and/or |
| Zr | 0–1.5 mol % and/or |
| W | 0–1.5 mol % and/or |
| Bi | 0–1.5 mol % and/or |
| Mg | 0–2 mol % and/or |
| Ca | 0–3 mol % and/or |
| Sr | 0–5 mol % and/or |
| Zn | 0–2 mol % and/or |
| Li | 0–2 mol % and/or |
| Na | 0–2 mol % and/or |
| K | 0–2 mol % and.or |
| Cs | 0–1 mol % and/or |
| Tl | 0–3 mol % and/or |
| Si | 0–2 mol % and/or |
| B | 0–2 mol % and/or |
| Sb | 0–1 mol %, | and being free of a Pb compound.

3. An optical glass having a refractive index (nd) within a range from 1.60 to 1.68 and an Abbe number (ν d) within a range from 40 to less than 65 and comprising, in mass %,

| metaphosphate compounds | 18.0–30.0% |
|---|---|
| where Al(PO$_3$)$_3$ | 10.0–20.0% |
| Ba(PO$_3$)$_2$ | 3.0–15.0% |
| fluorides | 43.0–65.0% |
| where BaF$_2$ | 41.0–55.0% |
| Gd$_2$O$_3$ | 8.0–25.0% and |
| Nb$_2$O$_5$ | 0.5–7.0%, | and being free of a Pb compound.

4. An optical glass having a refractive index (nd) within a range from 1.60 to 1.68 and an Abbe number (ν d) within a range from 40 to less than 65 and comprising, in mass %,

| metaphosphate compounds | 18.0–30.0% |
|---|---|
| where Al(PO$_3$)$_3$ | 10.0–20.0% |
| Ba(PO$_3$)$_2$ | 3.0–15.0% and |
| Sr(PO$_3$)$_2$ | 0.0–10.0% and/or |
| Ca(PO$_3$)$_2$ | 0.0–10.0% and/or |
| Zn(PO$_3$)$_2$ | 0.0–5.0% and/or |
| La(PO$_3$)$_3$ | 0.0–5.0% |
| fluorides | 43.0–65.0% |
| where BaF$_2$ | 41.0–55.0% and |
| SrF$_2$ | 0.0–10.0% and/or |
| CaF$_2$ | 0.0–10.0% and/or |
| MgF$_2$ | 0.0–2.0% and/or |
| AlF$_2$ | 0.0–2.0% and/or |
| GdF$_3$ | 0.0–15.0% and/or |
| YF$_3$ | 0.0–7.0% and/or |
| LaF$_3$ | 0.0–7.0% and/or |
| KHF$_2$ | 0.0–3.0% |
| Gd$_2$O$_3$ | 8.0–25.0% |
| Nb$_2$O$_5$ | 0.5–7.0% and |
| Y$_2$O$_3$ | 0.0–10.0% and/or |
| La$_2$O$_3$ | 0.0–10.0% and/or |
| Yb$_2$O$_3$ | 0.0–5.0% and/or |
| Ta$_2$O$_5$ | 0.0–5.0% and/or |
| Lu$_2$O$_3$ | 0.0–5.0% and/or |
| TiO$_2$ | 0.0–7.0% and/or |
| ZrO$_2$ | 0.0–5.0% and/or |
| WO$_3$ | 0.0–7.0% and/or |
| Bi$_2$O$_3$ | 0.0–5.0% and/or |
| BaO | 0.0–8.0% and/or |
| CaO | 0.0–5.0% and/or |
| SrO | 0.0–10% and/or |
| ZnO | 0.0–5.0% and/or |
| Li$_2$O | 0.0–1.0% and/or |
| Na$_2$O | 0.0–3.0% and.or |
| K$_2$O | 0.0–3.0% and/or |
| Cs$_2$O | 0.0–5.0% and/or |
| Tl$_2$O | 0.0–15.0% and/or |
| SiO$_2$ | 0.0–3.0% and/or |
| B$_2$O$_3$ | 0.0–3.0% and/or |
| Sb$_2$O$_3$ | 0.0–3.0%, | and being free of a Pb compound.

5. An optical glass having a refractive index (nd) within a range from 1.60 to 1.68 and an Abbe number (ν d) within a range from 40 to less than 65 and having a composition which comprises, calculated on oxide basis and expressed in mass %,

| | |
|---|---|
| $P_2O_5$ | 12–less than 22% |
| $Al_2O_3$ | 1–5% |
| BaO | 40–55% |
| $Gd_2O_3$ | 8–25% |
| $Nb_2O_3$ | 0.5–8% and |
| $Y_2O_3$ | 0–10% and/or |
| $La_2O_3$ | 0–10% and/or |
| $Yb_2O_3$ | 0–5% and/or |
| $Ta_2O_5$ | 0–5% and/or |
| $Lu_2O_3$ | 0–5% and/or |
| $TiO_2$ | 0–7% and/or |
| $ZrO_2$ | 0–5% and/or |
| $WO_3$ | 0–7% and/or |
| $Bi_2O_3$ | 0–5% and/or |
| MgO | 0–1% and/or |
| CaO | 0–5% and/or |
| SrO | 0–10% and/or |
| ZnO | 0–5% and/or |
| $Li_2O$ | 0–1% and/or |
| $Na_2O$ | 0–3% and/or |
| $K_2O$ | 0–3% and/or |
| $Cs_2O$ | 0–5% and/or |
| $Tl_2O$ | 0–15% and/or |
| $SiO_2$ | 0–3% and/or |
| $B_2O_3$ | 0–3% and/or |
| $Sb_2O_3$ | 0–3% | and a fluoride or fluorides of a metal element or elements contained in the above metal oxides, a total amount of F contained in the fluoride or fluorides being 8–20 weight parts to 100 weight parts of said composition calculated on the oxide basis, and being free of a Pb compound.

6. An optical glass as defined in any of claims 1–5 wherein difference between photoelastic constant at 644 nm and photoelastic constant at 436 nm is within a range from $-0.1 \times 10^{-5}$ nm·cm$^{-1}$·Pa$^{-1}$ to $0.1 \times 10^{-5}$ nm·cm$^{-1}$·Pa$^{-1}$.

7. An optical glass as defined in any of claims 1–5 wherein photoelastic constant at 546 nm is within a range from $-0.1 \times 10^{-5}$ nm·cm$^{-1}$·Pa$^{-1}$ to $0.3 \times 10^{-5}$ nm·cm$^{-1 \cdot Pa-1}$ in a region of refractive index (nd) within a range from 1.60 to 0.1.62, photoelastic constant at 546 nm is within a range from $-0.1 \times 10^{-5}$ nm·cm$^{-1}$·Pa$^{-1}$ to $0.5 \times 10^{-5}$ nm·cm$^{-1}$·Pa$^{-1}$ in a region of refractive index (nd) within a range from 1.62 to 1.68, and difference between photoelastic constant at 644 nm and photoelastic constant at 436 nm is within a range from $-0.1 \times 10^{-5}$ nm·cm$^{-1}$·Pa$^{-1}$ to $0.1 \times 10^{-5}$ nm·cm$^{-1}$·Pa$^{-1}$.

8. An optical glass as defined in any of claims 1–5 having a refractive index (nd) within a range from 1.60 to 1.65 and an Abbe number (ν d) within a range from 50 to less than 65 wherein photoelastic constant at 546 nm is within a range from $-0.1 \times 10^{-5}$ nm·cm$^{-1}$·Pa$^{-1}$ to $0.3 \times 10^{-5}$ nm·cm$^{-1}$·Pa$^{-1}$, and difference between photoelastic constant at 644 nm and photoelastic constant at 436 nm is within a range from $-0.1 \times 10^{-5}$ nm·cm$^{-1}$·Pa$^{-1}$ to $0.1 \times 10^{-5}$ nm·cm$^{-1}$·Pa$^{-1}$.

9. A polarizing beam splitter for a liquid crystal display projector using an optical glass as defined in any of claims 1–5.

10. A polarizing beam splitter for a liquid crystal display projector using an optical glass as defined in claim 6.

11. A polarizing beam splitter for a liquid crystal display projector using an optical glass as defined in claim 7.

12. A polarizing beam splitter for a liquid crystal display projector using an optical glass as defined in claim 8.

\* \* \* \* \*